(12) United States Patent
Nijland et al.

(10) Patent No.: US 12,318,986 B2
(45) Date of Patent: Jun. 3, 2025

(54) FESTOONER AND METHOD FOR BUFFERING A STRIP

(71) Applicant: VMI Holland B.V., Epe (NL)

(72) Inventors: Gerrit Roy Nijland, Epe (NL); Teunis Johannes Verbruggen, Epe (NL); Jochem Johannes Van Steenis, Epe (NL); Gerrit Mulder, Epe (NL)

(73) Assignee: VMI HOLLAND B.V., Epe (NL)

( * ) Notice: Subject to any disclaimer, the term of this patent is extended or adjusted under 35 U.S.C. 154(b) by 0 days.

(21) Appl. No.: 18/275,197

(22) PCT Filed: Jan. 17, 2022

(86) PCT No.: PCT/NL2022/050011
§ 371 (c)(1),
(2) Date: Jul. 31, 2023

(87) PCT Pub. No.: WO2022/164309
PCT Pub. Date: Aug. 4, 2022

(65) Prior Publication Data
US 2024/0083086 A1    Mar. 14, 2024

(30) Foreign Application Priority Data
Jan. 29, 2021 (NL) ........................... 2027461

(51) Int. Cl.
*B29C 48/355*    (2019.01)
*B29D 30/00*    (2006.01)
(Continued)

(52) U.S. Cl.
CPC ............ *B29C 48/355* (2019.02); *B29D 30/16* (2013.01); *B65H 23/1888* (2013.01); *B29D 2030/0038* (2013.01); *B65H 20/34* (2013.01)

(58) Field of Classification Search
CPC .... B65H 20/30; B65H 20/34; B65H 23/1955; B65H 23/195; B65H 23/1888; B65H 23/188; B65H 23/185
See application file for complete search history.

(56) References Cited

U.S. PATENT DOCUMENTS

| 4,009,814 A | 3/1977 | Singh ........................... 226/113 |
| 6,425,547 B1 | 7/2002 | Singh ........................... 242/527 |

(Continued)

FOREIGN PATENT DOCUMENTS

| CN | 101161448 | 4/2008 | ............ B29D 30/30 |
| CN | 205855525 | 1/2017 | ............ B65H 23/26 |

(Continued)

OTHER PUBLICATIONS

Sakai et al. "JP 09118462, machine translation", published 1997 (Year: 1997).*

(Continued)

*Primary Examiner* — Alex B Efta
(74) *Attorney, Agent, or Firm* — HAYES SOLOWAY P.C.

(57) ABSTRACT

Disclosed is a festooner and a method for buffering a strip, wherein the festooner includes a first holder and a second holder which are oppositely movable towards and away from each other in a buffer direction to vary a buffer capacity of the festooner, and a first set of buffer rollers and a second set of buffer rollers held by the first holder and the second holder, respectively, wherein the first set of buffer rollers and the second set of buffer rollers define a meandering buffer path between them. The festooner further includes an endless drive element for driving each buffer roller, wherein the festooner further includes an overlength collector for collecting and paying out an overlength of the endless drive element.

15 Claims, 12 Drawing Sheets

(51) Int. Cl.
B29D 30/16 (2006.01)
B65H 20/34 (2006.01)
B65H 23/188 (2006.01)

(56) References Cited

U.S. PATENT DOCUMENTS

| | | | | |
|---|---|---|---|---|
| 10,857,750 | B2 | 12/2020 | Schouten et al. | B29D 30/46 |
| 11,299,362 | B2 | 4/2022 | Raul et al. | B65H 23/1888 |
| 2002/0059013 | A1 | 5/2002 | Rajala et al. | 700/122 |
| 2006/0113348 | A1 | 6/2006 | Nawata | 226/44 |
| 2013/0284786 | A1 | 10/2013 | Fitts et al. | 226/118.3 |
| 2020/0216281 | A1 | 7/2020 | Raul et al. | B65H 23/1888 |

FOREIGN PATENT DOCUMENTS

| | | | | |
|---|---|---|---|---|
| EP | 2004210489 | | 7/2004 | B65H 51/22 |
| EP | 2005506257 | | 3/2005 | B65H 20/34 |
| EP | 1595838 | | 11/2005 | B65H 51/24 |
| EP | 3030411 | | 11/2018 | B29D 30/30 |
| EP | 3030412 | | 11/2018 | B29D 30/30 |
| EP | 3466855 | | 4/2019 | B65H 20/34 |
| EP | 3466855 | A1 * | 4/2019 | B65H 20/34 |
| JP | 50134492 | | 11/1975 | B65H 20/34 |
| JP | 6181016 | | 6/1994 | H01B 13/00 |
| JP | 9118462 | | 5/1997 | B65H 56/188 |
| JP | 09118462 | A * | 5/1997 | |
| JP | 2009184760 | | 8/2009 | B29D 30/30 |
| JP | 2019059567 | | 4/2019 | B65H 20/34 |
| KR | 20030042666 | | 6/2003 | B29D 30/08 |
| KR | 1020190086456 | | 7/2019 | B29D 30/46 |
| KR | 1020200011542 | | 2/2020 | B65H 26/04 |
| NL | 2001509 | | 10/2009 | B29D 30/30 |
| WO | WO2018182410 | | 10/2018 | B65H 49/32 |
| WO | 2019243956 | | 12/2019 | B65H 20/34 |

OTHER PUBLICATIONS

Decision to Grant issued in Japanese Patent Appln. Serial No. 2022-566096, dated Nov. 21, 2023, with machine English translation, 6 pages.
Office Action issued related U.S. Appl. No. 18/275,194, dated May 3, 2024, 21 pages.
Notice of Allowance issued in related Korean Patent Application Serial No. 10-2023-7029216, dated Apr. 19, 2024, with translation, 10 pages.
U.S. Appl. No. 18/275,194, filed Jul. 31, 2023, Verbruggen et a;/.
International Search Report and Written Opinion issued in PCT/NL2022/050013, dated May 2, 2022, 10 pages.
International Preliminary Report on Patentability issued in PCT/NL2022/050013, dated Jul. 31, 2023, 8 pages.
Notice of Reason for Refusal issued in Japanese Patent Appln. Serial No. 2002-529104, dated Aug. 8, 2023, with English translation, 4 pages.
International Search Report and Written Opinion issued in PCT/NL2022/050011, dated Sep, 5, 2022, 25 pages.
International Preliminary Report on Patentability issued in PCT/NL2022/050011, dated Jul. 31, 2023, 19 pages.

* cited by examiner

FESTOONER AND METHOD FOR BUFFERING A STRIP

BACKGROUND

The invention relates to a festooner and a method for buffering a strip, in particular a strip used in tire building.

A festooner is used to temporarily store, accumulate or buffer a length of a strip between a continuous input and a discontinuous output. The festooner may for example be placed between an extruder for extruding a continuous strip and a cutter for cutting said continuous strip into cut-to-length components for a tire. The festooner comprises two groups of rollers that can move towards and away from each other to vary the buffering capacity of the festooner. The rollers passively rotate together with the strip as the strip is transported through the festooner.

The strip may deform as a result of the forces occurring in the festooner. In particular, when a relatively thin or unenforced strip is fed over the rollers, the inertia that has to be overcome to set the rollers in motion, however small, can cause tensile forces in the strip. To solve this problem, it is known to provide the strip with a liner of a relatively strong material that strengthens the strip along its path through the festooner. After the strip has left the festooner, the strip and the liner are separated and the liner is collected in a scrap bin.

KR 2003-0042666 A acknowledges that thin strips are sensitive to small factors causing deformation of the material. It proposes the use of a chain that drives the rollers at the correct speed so that tensile forces in the strip can be eliminated, thus preventing deformation in the strip as a result of external forces. It further discloses a twisted belt that is arranged in an endless loop along the path of the strip and that acts as a liner to prevent direct contact between the strip and the rollers.

SUMMARY OF THE INVENTION

When an operator manually feeds a new strip into the festooner, it is convenient to move the two groups of rollers towards each other so that the operator does not have to guide the strip up and down over large distances. In other words, the groups of rollers are moved into a position in which the capacity of the festooner is at a minimum. A disadvantage of the known festooner according to KR 2003-0042666 A is that the group of rollers at the upper end of the festooner are fixed to said upper end and that, consequently, the group of rollers at the lower end have to be moved all the way up to the group of rollers at the upper end. Near said upper end, the groups of rollers can be as high as two or three meters of the ground and are not easily reachable for manual loading.

Moreover, the new strip has to be carefully placed on the surface of the twisted belt, having a twist between each pair of rollers. This can be hard, in particular when the groups of rollers are close together and the twists are relatively sharp.

Finally, each twist can potentially deform or damage the strip.

It is an object of the present invention to provide a festooner and a method for buffering a strip, wherein the ergonomics of feeding a new strip into the festooner can be improved.

According to a first aspect, the invention provides a festooner for buffering a strip, wherein the festooner comprises a first holder and a second holder which are oppositely movable towards and away from each other in a buffer direction to vary a buffer capacity of the festooner, and a first set of buffer rollers and a second set of buffer rollers held by the first holder and the second holder, respectively, wherein the first set of buffer rollers and the second set of buffer rollers define a meandering buffer path between them extending alternatingly along a buffer roller of the first set of buffer rollers and a buffer roller of the second set of buffer rollers, wherein the festooner further comprises an endless drive element for driving each buffer roller of the first set of buffer rollers and the second set of buffer rollers, wherein the festooner further comprises an overlength collector for collecting and paying out an overlength of the endless drive element as a result of a variation in the buffer capacity of the festooner.

The drive element extends or travels along the buffer path of the strip and more or less behaves in the same manner as the strip, the speed at which each buffer roller of the first set of buffer rollers and the second set of buffer rollers is driven can be kept equal or substantially equal to the speed of the strip at the respective buffer roller. Hence, the strip does not have to overcome the inertia of the buffer rollers and can be transported through the festooner without excessive tensile forces being exerted onto the strip. The festooner is therefore suitable for buffering fragile or easily deformable strips, such as gum strips used in tire building, without the need for a liner.

With both holders being movable towards each other, a more ergonomic loading position can be obtained for manually loading the strip into the festooner.

In a preferred embodiment the overlength collector is located in the buffer direction at one side of the buffer path only. A considerable part of the overlength of the drive element, and preferably all or the entire overlength of the drive element, can be collected at one end of the festooner only. In other words, there are no parts of the festooner responsible for the collection of the drive element at the other side of the buffer path and/or the other end of the festooner. Consequently, more space of the festooner can be used to buffer the strip. Hence, the capacity of the festooner can be increased, Alternatively, the resulting festooner can be more compact while keeping the same capacity. More specifically, the festooner can be loaded more ergonomically because the distances between the oppositely moving holders and/or the loading positions of said holders can be improved.

Preferably, the overlength collector is located in the buffer direction at a side of the first set of buffer rollers facing away from the second set of buffer rollers. Hence, the overlength collector does not interfere with the second set of buffer rollers and/or the second holder.

Additionally or alternatively, the first set of buffer rollers is located above the second set of buffer rollers, wherein the overlength collector is located above the first set of buffer rollers. With the overlength collector located overhead, the part of the festooner that buffers the strip can be located closer to the ground surface, i.e. within a range in which the festooner can be conveniently loaded by an operator.

In another embodiment the overlength collector has a collector capacity that is sufficient to collect the entire overlength of the endless drive element when the buffer capacity of the festooner is at a minimum. The endless drive element can thus be created with a length sufficient to accommodate the festooner across its entire range of movement from maximum buffer capacity up to minimum buffer capacity, i.e. without the endless drive element limiting the festooners buffer capacity.

In another embodiment the overlength collector comprises a first set of collector wheels and a second set of collector wheels that define a meandering collector path between them extending alternatingly along a collector wheel of the first set of collector wheels and a collector wheel of the second set of collector wheels, wherein the endless drive element extends along the collector path. The meandering collector path can be used to temporarily collect and subsequently pay out the overlength of the endless drive element in substantially the same way as the buffer path is used to buffer the strip.

Preferably, the meandering buffer path comprises a plurality of first line segments extending between the buffer rollers of the first set of buffer rollers and the second set of buffer rollers, wherein the meandering collector path comprises a plurality of second line segments extending between the collector wheels of the first set of collector wheels and the second set of collector wheels, wherein the number of second line segments is at least twice the number of first line segments. Hence, with a relative movement between the collector wheels of the first set of collector wheels and the second set of collector wheels in one direction of the buffer direction only, the collector path can be increased or decreased with at least the same amount that the buffer path is decreased or increased as a result of the opposite movement of both the first holder and the second holder in the buffer direction. In other words, the overlength collector can collect overlength generated by the movement of the first holder and the movement of the second holder simultaneously at one side of the buffer path. When increasing or decreasing the number of second line segment to more or less than twice the number of first line segments, one of the holders will move faster or slower, respectively, than the other in response to a capacity change of the festooner, thereby changing the respective loading positions.

In a further embodiment the overlength collector comprises a collector frame that is arranged to remain stationary in the buffer direction while the first holder and the second holder move, wherein the first set of collector wheels is held by the first holder and wherein the second set of collector wheels is held by the collector frame. Preferably, the collector frame is located above the first holder in the buffer direction. Hence, the relative movement between the collector wheels of the first set of collector wheels and the second set of collector wheels can be generated by moving the first holder relative to the collector frame.

In a further embodiment the endless drive element is a chain, wherein the first set of collector wheels and the second set of collector wheels comprise sprocket wheels. The sprocket wheels can effectively engage with the chain and guide said chain through the overlength collector along the collector path.

In another embodiment the festooner comprises a first set of buffer wheels and a second set of buffer wheels that are coaxially mounted to and rotatable together with the first set of buffer rollers and the second set of buffer rollers, respectively, wherein the endless drive element is arranged for driving each buffer roller of the first set of buffer rollers and the second set of buffer rollers individually by engaging the respective buffer wheels of the first set of buffer wheels and the second set of buffer wheels, respectively. Hence, each buffer roller can be driven at a speed that corresponds to the speed of the drive element at the location of the respective buffer roller. When the capacity of the festooner is varied, the speed may be different for each buffer roller depending on the position of the respective buffer roller along the buffer path.

In another embodiment the festooner further comprises an intermediate member for guiding the strip into and out of the festooner, wherein the intermediate member is arranged to remain stationary in the buffer direction between the first holder and the second holder while the first holder and the second holder move. The strip can thus be fed into and led out of the festooner at a constant height or position, independent of the movements of the first holder and the second holder.

Preferably, the first holder and the second holder are movable in the buffer direction towards each other into a first loading position and a second loading position, respectively, directly adjacent to and on opposite sides of the intermediate member. In said loading positions, the operator does not have to reach all the way up or all the way down the festooner to reach the buffer rollers on the first holder and the second holder. Instead, the buffer rollers can be conveniently positioned in close proximity to the intermediate member so that the strip can be guided through the buffer path ergonomically and/or without too much effort.

Additionally or alternatively, the festooner comprises a base for placement of said festooner on a ground surface, wherein the intermediate member is positioned relative to the base such that the intermediate member extends at a height above the ground surface in a range of fifty centimeters to one-hundred-and-eighty centimeters. At said height, the intermediate member, and the holders positioned in their respective loading positions adjacent to said intermediate member, are at an ergonomic height for manually loading the strip into the festooner.

In another embodiment the buffer direction is vertical or substantially vertical.

In another embodiment the festooner further comprises a tensioner for exerting a tensioning force onto the first holder and the second holder in the buffer direction. The tensioning force is intended to mitigate the effects of driving forces being exerted onto said holders by the endless drive element. Said driving forces may for example be caused by friction between the endless drive element and the buffer/collector wheels and/or by kinetic energy generated within the endless drive element itself. When such driving forces exceed the mass of the first holder and/or the second holder, they may cause one or both of said holders to move unpredictably.

In one embodiment thereof the festooner comprises a tensioning band that is connected to the first holder and the second holder, wherein at least one end of the tensioning band is coupled to a tension adjustment member. The tension adjustment member, in particular a pneumatic cylinder, can be controlled to retract or extend in a tension direction, thereby increasing or decreasing the tension in the tensioning band and/or compensating for a difference in length when the first holder and the second holder are moved over different distances.

In an alternative embodiment thereof the festooner comprises a tensioning band that is connected to the first holder and the second holder, wherein at least one end of the tensioning band is coupled to a tension biasing member. The tension biasing member, in particular a spring, can be biased to pull on the tensioning band in a tensioning direction.

According to a second aspect, the invention provides a festooner for buffering a strip, wherein the festooner comprises a first holder and a second holder, wherein at least one of the first holder and the second holder is movable towards and away from the other of the first holder and the second holder in a buffer direction to vary a buffer capacity of the festooner, wherein the festooner further comprises a first set of buffer rollers and a second set of buffer rollers held by the first holder and the second holder, respectively, wherein the first set of buffer rollers and the second set of buffer rollers define a meandering buffer path between them extending alternatingly along a buffer roller of the first set of buffer rollers and a buffer roller of the second set of buffer rollers, wherein the festooner further comprises a plurality of drives to drive the buffer rollers of the first set of buffer rollers and the second set of buffer rollers individually.

This embodiment allows for specifically setting and/or controlling each drive to a different speed, thereby rotating each buffer roller almost at the same speed or at exactly the same speed as the strip travelling along the buffer path. Hence, any speed differences between the strip and the buffer rollers can be prevented. Hence, the strip does not have to overcome any inertia of the buffer rollers and can be transported through the festooner without any tensile force occurring in the strip. Hence, the festooner can be used to transport fragile or easily deformable strips, such as gum strips used in tire building, without the need for a liner.

Preferably, the plurality of drives are electric motors. These electric motors can be easily controlled by a suitable control unit.

Additionally or alternatively, the festooner further comprises a control unit that is operationally connected to each drive of the plurality of drives and that is configured to control each drive of the plurality of drives individually. As mentioned above, by controlling each drive individually any speed differences between the strip and the buffer rollers can be prevented.

In a further embodiment thereof the strip enters the festooner with an entry speed and exits the festooner with an exit speed, wherein the buffer capacity of the festooner changes with a capacity change speed, wherein the control unit is configured for controlling each drive of the plurality of drives based on the entry speed, the exit speed, the capacity change speed and/or the position of the respective drive within the festooner. These input parameters for the control unit can be effectively used to determine the correct speed for each drive.

In a further embodiment the festooner further comprises a festooner motor that is operationally coupled to the first holder and/or the second holder to generate a relative movement between the first holder and the second holder in the buffer direction. The festooner motor can be controlled in correspondence with the drives and/or vice versa to match the change in capacity to the relative speed between the buffer rollers and the strip.

In a further embodiment the first holder and the second holder are oppositely movable towards and away from each other in a buffer direction to vary a buffer capacity of the festooner. With both holders being movable towards each other, a more ergonomic loading position can be obtained for manually loading the strip into the festooner. More in particular, the first holder and the second holder are movable in the buffer direction towards each other into a first loading position and a second loading position, respectively, on opposite sides of an intermediate position at a height above the ground surface in a range of fifty centimeters to one-hundred-and-eighty centimeters.

According to a third aspect, the invention provides a festooner for buffering a strip, wherein the festooner comprises a first holder and a second holder which are oppositely movable towards and away from each other in a buffer direction to vary a buffer capacity of the festooner, and a first set of buffer rollers and a second set of buffer rollers held by the first holder and the second holder, respectively, wherein the first set of buffer rollers and the second set of buffer rollers define a meandering buffer path between them extending alternatingly along a buffer roller of the first set of buffer rollers and a buffer roller of the second set of buffer rollers, wherein the festooner further comprises a holder drive that is operationally coupled to the first holder and the second holder for driving the opposite movements between the first holder and the second holder in the buffer direction towards and away from each other, wherein the holder drive is configured for driving the movement of the first holder in an uneven ratio to the movement of the second holder.

The buffer capacity of a festooner can be increased by increasing the distance between the first holder and the second holder when the festooner is at maximum capacity. Consequently, the height of the festooner is increased. The holders can be moved from their respective outer positions towards respective loading positions on opposite sides of an intermediate position for convenient manual loading of the strip. Conventionally, the holders are moved in opposite directions at a 1:1 ratio, causing them to meet at a half distance intermediate position which, in case of a relatively high festooner, is above the ergonomic height for a human operator standing on ground level. It is known to provide a raised platform for the human operator or to create a pit in which a part of the festooner can be lowered such that the loading position is at an ergonomic height above ground level. In some cases, there is no room to create a pit and a platform is not desirable. In such cases, the festooner according to the third aspect of the invention provides holders that can be moved at an uneven ratio to an off-center intermediate position that is within the ergonomic reach of the human operator standing on ground level.

Preferably, the uneven ratio is at least 1.1:1, preferably at least 1.5:1 and most preferably at least 2:1. The higher the ratio, the more off-center the intermediate position is.

In a further embodiment the first holder is located above the second holder in the buffer direction. Hence, the first holder can be moved faster or over a greater distance than the second holder towards the intermediate position. Consequently, the intermediate position can be positioned below the half distance of center of the festooner in the buffer direction.

In a further embodiment the first holder and the second holder are movable in the buffer direction towards each other into a first loading position and a second loading position, respectively, on opposite sides of an intermediate position at a height above the ground surface in a range of fifty centimeters to one-hundred-and-eighty centimeters. Said range is within the ergonomic reach of a human operator standing on ground level.

In one embodiment the holder drive comprises a belt and a plurality of pulleys that form a belt and pulley system with a reeving factor of at least two, wherein the first holder is coupled to a single part of the belt and the second holder is coupled at least two parts of the belt. The belt and pulley system can be easily configured to achieve the aforementioned uneven ratio by choosing the reeving factor in accordance with the desired travel advantage of one of the holders over the other, and connecting the respective holders to the parts of the belt to transfer said travel advantage.

Alternatively, the holder drive comprises a first motor and a second motor for moving the first holder and the second holder, respectively, in the buffer direction and a control unit that is operationally connected to the first motor and the second motor to control the movement in the uneven ratio. The motors can be individually controlled to move the respective holders at the desired travel rate, thereby obtaining the aforementioned uneven ratio.

According to a fourth aspect, the invention provides a method for buffering a strip using a festooner according to the first aspect of the invention, wherein the method comprises the steps of:
- guiding a strip through the festooner along the buffer path;
- driving each buffer roller of the first set of buffer rollers and the second set of buffer rollers with the endless drive element;
- varying the buffer capacity of the festooner by moving the first holder and the second holder towards and/or away from each other in the buffer direction; and
- collecting and/or paying out the overlength of the endless drive element with the overlength collector in response to varying the buffer capacity.

The method above relates to the practical implementation of the festooner according to the first aspect of the invention and thus has the same technical advantages, which will not be repeated hereafter.

Preferably, the festooner further comprises an intermediate member for guiding the strip into and out of the festooner and a base for placement of said festooner on a ground surface, wherein the method further comprises the steps of:
- maintaining the intermediate member in the buffer direction between the first holder and the second holder in a stationary position at a height above the ground surface in a range of fifty centimeters to one-hundred-and-eighty centimeters;
- moving the first holder and the second holder in the buffer direction towards each other into a first loading position and a second loading position, respectively, directly adjacent to and on opposite sides of the intermediate member; and
- manually guiding the strip through the festooner along the buffer path while the first holder and the second holder are in the first loading position and the second loading position, respectively.

According to a fifth aspect, the invention provides a method for buffering a strip using a festooner, wherein the festooner comprises a first holder and a second holder, wherein at least one of the first holder and the second holder is movable towards and away from the other of the first holder and the second holder in a buffer direction to vary a buffer capacity of the festooner, wherein the festooner further comprises a first set of buffer rollers and a second set of buffer rollers held by the first holder and the second holder, respectively, wherein the first set of buffer rollers and the second set of buffer rollers define a meandering buffer path between them extending alternatingly along a buffer roller of the first set of buffer rollers and a buffer roller of the second set of buffer rollers, wherein the method comprises the step of:
- driving each buffer roller of the first set of buffer rollers and the second set of buffer rollers individually.

The method above relates to the practical implementation of the festooner according to the second aspect of the invention and thus has the same technical advantages, which will not be repeated hereafter.

Preferably, the strip enters the festooner with an entry speed and exits the festooner with an exit speed, wherein the buffer capacity of the festooner changes with a capacity change speed, wherein the method further comprises the step of:
- driving each buffer roller of the first set of buffer rollers and the second set of buffer rollers based on the entry speed, the exit speed, the capacity change speed and/or the position of the respective buffer roller within the festooner.

According to a sixth aspect, the invention provides a method for buffering a strip using a festooner, wherein the festooner comprises a first holder and a second holder which are movable towards and away from each other in a buffer direction, and a first set of buffer rollers and a second set of buffer rollers held by the first holder and the second holder, respectively, wherein the festooner is arranged for receiving the strip along a buffer path meandering between the first set of buffer rollers and the second set of buffer rollers, wherein the strip enters the festooner with an entry speed and exits the festooner with an exit speed, wherein the buffer capacity of the festooner changes with a capacity change speed, wherein the method comprises the steps of:
- driving each buffer roller of the first set of buffer rollers and the second set of buffer rollers based on the entry speed, the exit speed, the capacity change speed and/or the position of the respective buffer roller within the festooner; and
- guiding a length of the strip through the festooner in direct contact with the buffer rollers of the first set of buffer rollers and the second set of buffer rollers.

Preferably, the length of the strip is guided through the festooner without using a support layer for supporting said length of the strip relative to the buffer rollers.

Without a liner, the buffering process can be less costly and/or more durable, because there is less waste.

According to a seventh aspect, the invention provides a method for buffering a strip using a festooner, wherein the festooner comprises a first holder and a second holder which are oppositely movable towards and away from each other in a buffer direction to vary a buffer capacity of the festooner, and a first set of buffer rollers and a second set of buffer rollers held by the first holder and the second holder, respectively, wherein the first set of buffer rollers and the second set of buffer rollers define a meandering buffer path between them extending alternatingly along a buffer roller of the first set of buffer rollers and a buffer roller of the second set of buffer rollers, wherein the method comprises the step of driving the movement of the first holder opposite to the second holder in an uneven ratio.

The method above relates to the practical implementation of the festooner according to the third aspect of the invention and thus has the same technical advantages, which will not be repeated hereafter.

Preferably, the uneven ratio is at least 1.1:1, preferably at least 1.5:1 and most preferably at least 2:1.

In a further embodiment the first holder is located above the second holder in the buffer direction.

In a further embodiment the first holder and the second holder are moved in the buffer direction towards each other into a first loading position and a second loading position, respectively, on opposite sides of an intermediate position at a height above the ground surface in a range of fifty centimeters to one-hundred-and-eighty centimeters.

The various aspects and features described and shown in the specification can be applied, individually, wherever possible. These individual aspects, in particular the aspects and features described in the attached dependent claims, can be made subject of divisional patent applications. For example, the embodiments that include the tensioner may be applied individually from features such as the overlength collector.

BRIEF DESCRIPTION OF THE DRAWINGS

The invention will be elucidated on the basis of an exemplary embodiment shown in the attached schematic drawings, in which.

DETAILED DESCRIPTION OF THE INVENTION

Figure 1:
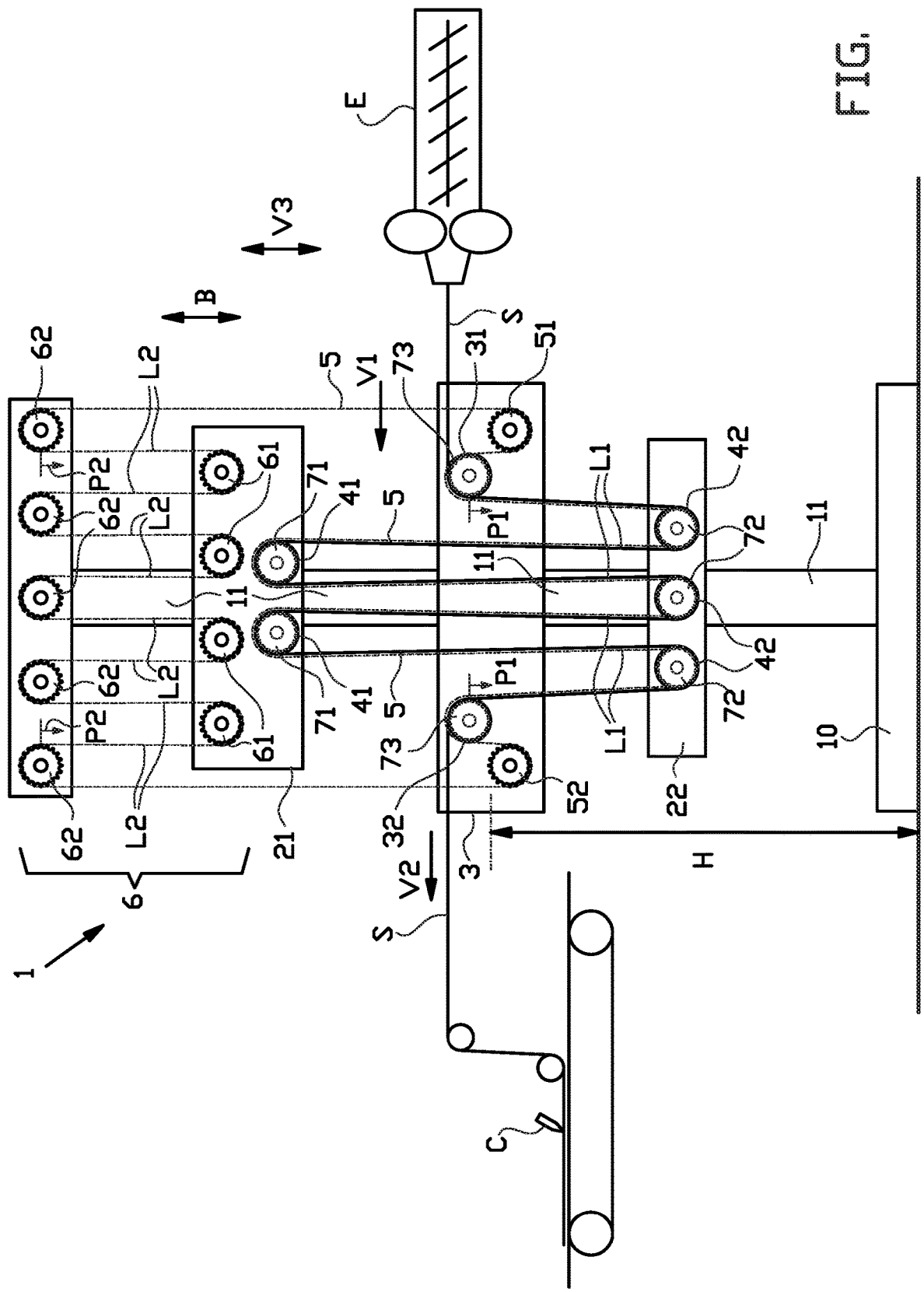
FIG. 1 shows a front view of a production line, comprising a festooner according to a first exemplary embodiment of the invention.

FIG. 1 shows a front view of a production line, comprising a festooner 1 according to a first exemplary embodiment of the invention, an extruder E and a cutter C. The extruder E is arranged for extruding a continuous strip S. The festooner 1 is used for temporarily accumulating or buffering the strip S between the continuous extrusion process of the extruder E and a discontinuous cutting process at the cutter C. The strip S is ultimately cut to length at the cutter C. The cut-to-length strip S can be used in tire building. In this example, the strip S is a gum strip that wrapped or folded around the sharp edges of a breaker ply to prevent that said sharp edges cut into other parts of the tire.

As shown in FIG. 1, the festooner 1 comprises a base 10 for placement of the festooner 1 on a ground surface, i.e. a factory floor, and a column or guide 11 standing upright from said base 10. The festooner 1 further comprises a first holder 21 and a second holder 22 which are movable opposite to each other along the guide 11, i.e. towards and away from each other, in a buffer direction B. The first holder 21 and the second holder 22 may comprise a bar-like body extending transverse or perpendicular to the buffer direction B. In this exemplary embodiment, the buffer direction B is parallel or substantially parallel to the guide 11. Preferably, the buffer direction B is vertical or substantially vertical.

The festooner 1 is provided with a first set of buffer rollers 41 and a second set of buffer rollers 42 held by or mounted to the first holder 21 and the second holder 22, respectively. Preferably, the buffer rollers of the first set of buffer rollers 41 are distributed over the first holder 21 at equal intervals. The first set of buffer rollers 41 and the second set of buffer rollers 42 define a buffer path P1 between them that meanders, i.e. that travels or extends alternatingly a buffer roller of the first set of buffer rollers 41 and a buffer roller of the second set of buffer rollers 42. In FIG. 1, the buffer path P1 has been schematically indicated with arrows indicating the start and end of the buffer path P1. It will be clear that the buffer path P1 extends between said arrows and coincides or substantially coincides with the path travelled by the strip S through the festooner 1. More in particular, the buffer path P1 comprises a plurality of first line segments L1 extending between the buffer rollers of the first set of buffer rollers 41 and the second set of buffer rollers 42. The first line segments L1 are bitangent to the pair of buffer rollers it interconnects. More specifically, each first line segment L1 extends as an outer tangent between a pair of buffer rollers of the first set of buffer rollers 41 and the second set of buffer roller 42. Preferably, the first line segments L1 are substantially parallel to each other and/or to the buffer direction B.

The festooner 1 further comprises an intermediate member 3 for guiding the strip S into and out of the festooner 1, i.e. into and out of the buffer path P1. The intermediate member 3 may comprise a bar-like body extending transverse or perpendicular to the buffer direction B. The intermediate member 3 is positioned relative to the base 10 such that the intermediate member 3 extends at a height H above the ground surface in a range of fifty centimeters to one-hundred-and-eighty centimeters, preferably one-hundred centimeters to one-hundred-and-eighty centimeters, more preferably one-hundred-and-twenty centimeters to one-hundred-and-sixty centimeters. Alternatively, a platform may be used for ergonomic access when the intermediate member 3 is positioned higher. The festooner 1 is provided with an entry roller 31 and an exit roller 32 held by the intermediate member 3 to guide the strip S into and out of the buffer path P1, respectively.

Figure 2A:
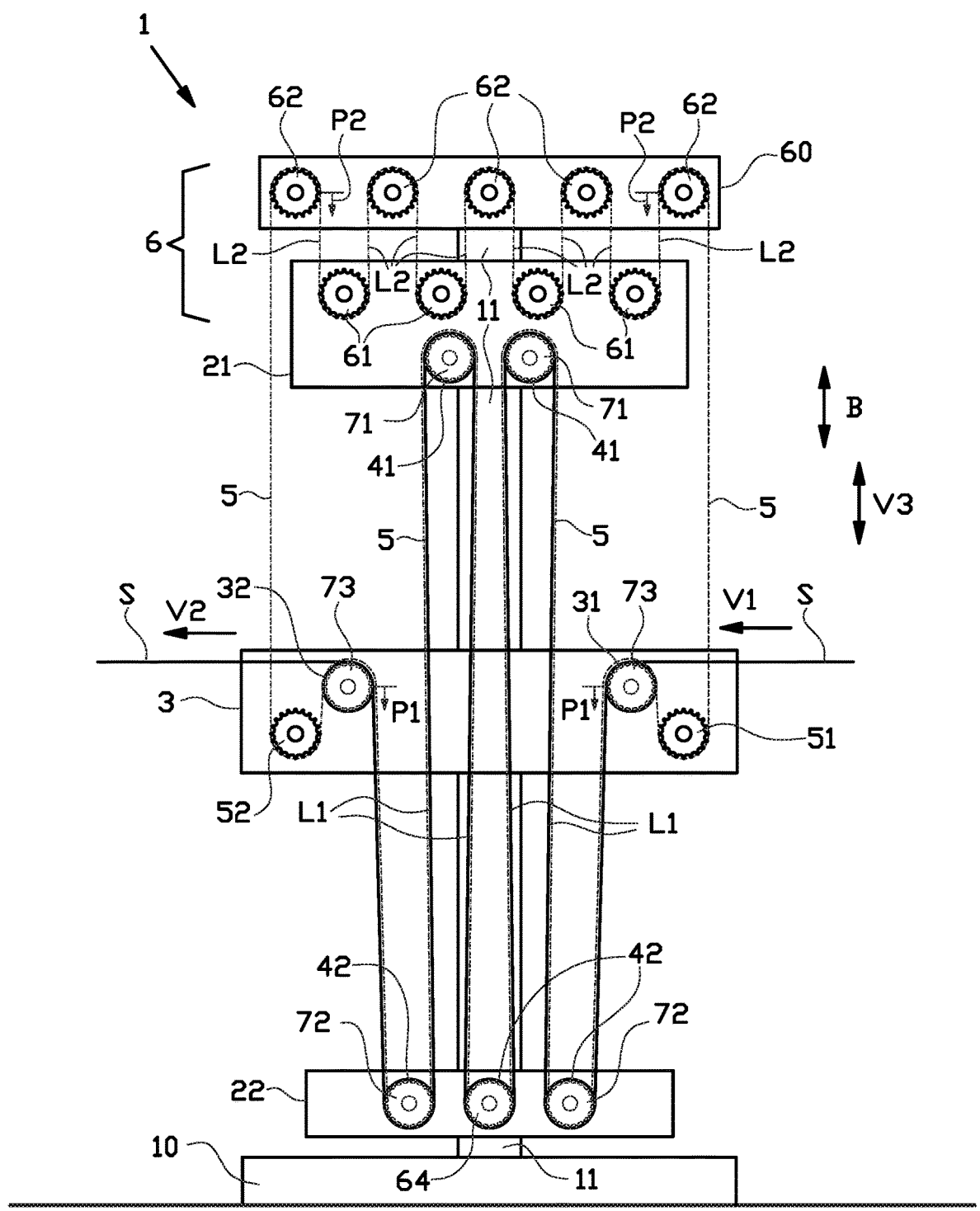
FIGS. 2A and 2B show front views of the festooner at maximum capacity and at minimum capacity, respectively.
Figure 2B:
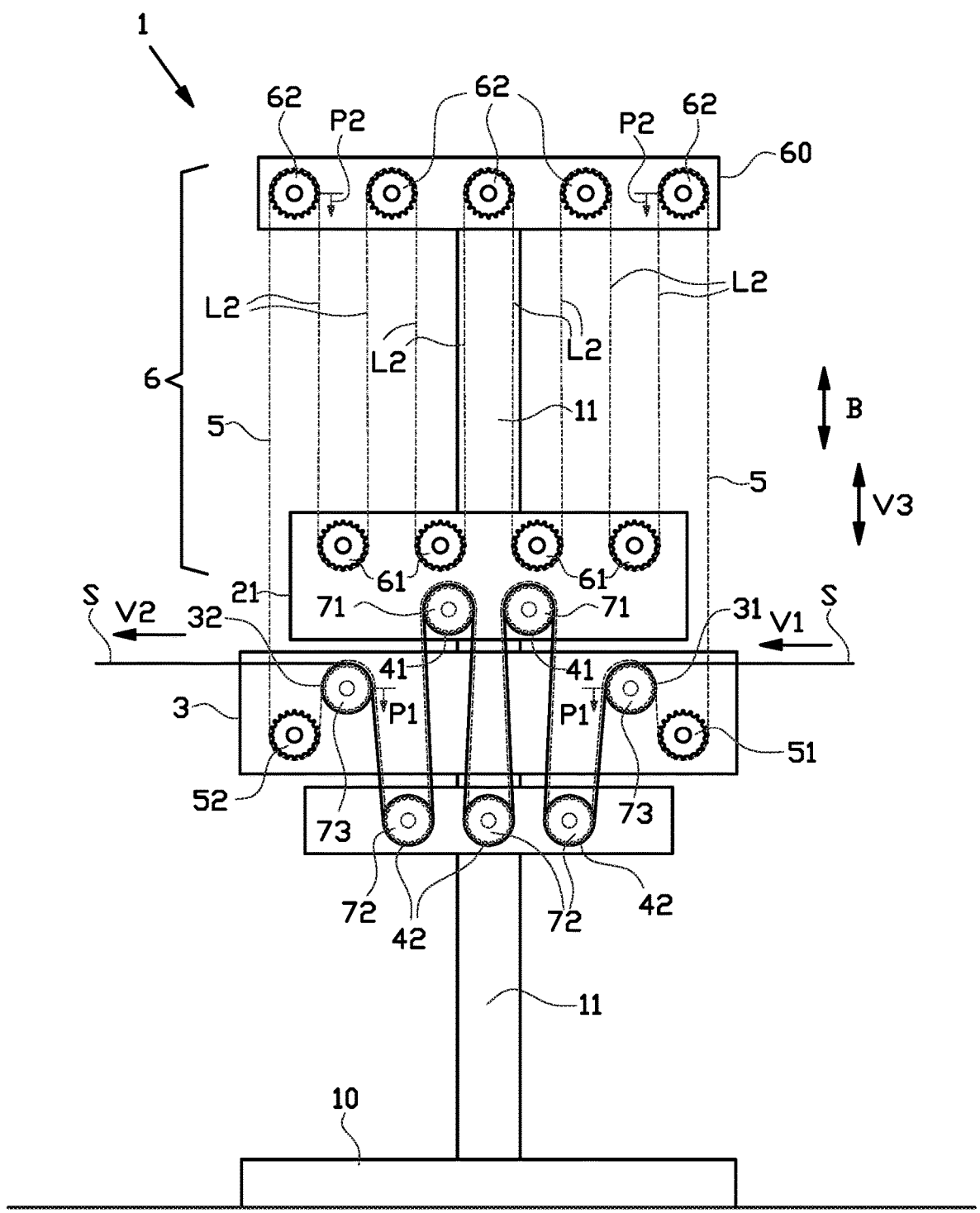

FIG. 2A shows the first holder 21 and the second holder 22 in a first outer position and a second outer position, respectively, maximally spaced apart from the intermediate member 3 in the buffer direction B. FIG. 2B shows the situation after the first holder 21 and the second holder 22 have been moved towards each other in the buffer direction B into a first loading position and a second loading position, respectively, as close as possible to, directly adjacent to and/or on opposite sides of the intermediate member 3. In said loading positions, the strip S can be conveniently guided along the buffer path P1 at a height H that is ergonomic for an operator. In particular, the operator does not have to reach up and down over long distances to manually load the strip S into the festooner 1.

As shown in FIG. 1, the festooner 1 further comprises an endless drive element 5 that extends at least partially alongside the buffer path P1 to drive the buffer rollers of the first set of buffer rollers 41 and the second set of buffer rollers 42. In other words, the drive element 5 extends in a loop and at least a part of said loop extends alongside the buffer path P1. The drive element 5 has a constant or substantially constant length. The festooner 1 is provided with one or more drives 51, 52 for causing the drive element 5 to move through the buffer path P1 at the same speed or substantially the same speed as the strip S, i.e. based on the speed of the strip S at the entry and/or exit of the buffer path P1 and/or based on the extrusion speed of the extruder E and/or based on the speed of the strip S at the cutter C. The drive element 5 runs along the buffer path P1 in the same direction as the strip S. The drive element 5 is then returned to the start of the buffer path P1 through another section of the festooner 1 to complete the loop.

In this exemplary embodiment, the endless drive element 5 is a chain. Alternatively, a drive belt, timing belt or the like may be used. The festooner 1 comprises a plurality of buffer wheels 71-73, in particular sprocket wheels, that engage with the drive element 5 to be driven by said drive element 5. Each buffer wheel of the plurality of buffer wheels 71-73 is coaxially mounted to and/or rotatable together with a respective one of the buffer rollers of the first set of buffer rollers 41 and the second set of buffer roller 42 or one of the entry roller 31 and the exit roller 32. In particular, the first set of buffer wheels 71 is held coaxially with the first set of buffer rollers 41 by the first holder 21. The second set of buffer wheels 72 is held coaxially with the second set of buffer rollers 42 by the second holder 22. The third set of buffer wheels 73 is held coaxially with the entry roller 31 and the exit roller 32 by the intermediate member 3.

When the plurality of buffer wheels 71-73 are driven in rotation by the drive element 5, the buffer rollers 41, 42, the entry roller 31 and the exit roller 32 are rotated as well. The diameter of the plurality of buffer wheels 71-73 is chosen so as to support the drive element 5 at the same or substantially the same radius at which the strip S is supported on the buffer rollers 41, 42, the entry roller 31 and/or the exit roller 32. The two drives 51, 52 are preferably formed by two wheels, in particular two driven sprocket wheels.

The strip S enters the festooner 1, i.e. at the entry roller 31, with an entry speed V1 and exits the festooner 1, i.e. at the exit roller 32, with an exit speed V2. The buffer capacity of the festooner 1 can be changed by moving the first holder 21 and the second holder 22 oppositely in the buffer direction B. The speed at which the capacity changes is schematically shown with speed arrow V3 parallel to the buffer direction B. Because the drive element 5 travels along the buffer path P1 of the strip S and more or less behaves in the same manner as the strip S, the speed at which each buffer roller of the first set of buffer rollers 41 and the second set of buffer rollers 42 is driven is equal or substantially equal to the speed of the strip S at the respective buffer roller. In other words, the drive element 5 will automatically cause each buffer roller of the first set of buffer rollers 41 and the second set of buffer rollers 42 to change its rotational speed in response to a change in capacity of the festooner 1. In particular, each buffer roller of the first set of buffer rollers 41 and the second set of buffer rollers 42 can be driven automatically at the right speed by the drive element 5 in response to a change in entry speed V1, exit speed V2, the capacity change speed V3 and/or the position of the respective buffer roller within the festooner 1.

FIGS. 2A and 2B show the festooner 1 at maximum capacity and minimum capacity, respectively. It will be appreciated that the length of the buffer path P1 when the festooner 1 is at maximum capacity is considerably longer than the length of the buffer path P1 when the festooner 1 is at minimum capacity. The length of the drive element 5 travelling along the buffer path P1 is varied with the same amount, while the overall length of the drive element 5 remains the same. At minimum capacity of the festooner 1, a considerable overlength of the drive element 5 needs to be temporarily collected. To this end, the festooner 1 is provided with an overlength collector 6 for collecting and paying out (or off-load) the overlength of the drive element 5.

The overlength collector 6 has a collector capacity that is sufficient to collect the entire overlength of the endless drive element 5 when the buffer capacity of the festooner 1 is at a minimum.

In this exemplary embodiment the overlength collector 6 is located in the buffer direction B at one side of the buffer path P1 only. In this particular case, the overlength collector 6 is located in the buffer direction B at a side of the first set of buffer rollers 41 facing away from the second set of buffer rollers 42. In other words, the overlength collector 6 is located above the buffer path P1, the first set of buffer rollers 41 and/or the first holder 21, i.e. at or near the top end of the festooner 1. This has the technical advantage that overlength is being collected at one end of the festooner 1 only. The resulting festooner 1 can be more compact and/or more ergonomic. In particular, when the overlength collector 6 is located at or near the top of the festooner 1, the part of the festooner 1 that buffers the strip S can be located closer to the ground surface. Conveniently, the previously mentioned height H of the intermediate member 3 above the ground surface can be obtained, so that—despite the presence of the overlength collector 6—the strip S can be loaded ergonomically into the festooner 1.

Alternatively, when a compact height and/or ergonomic loading are not required, the overlength collector may be split up and located on both sides of the festooner 1 in the buffer direction B.

As best seen in FIG. 1, the overlength collector 6 comprises a first set of collector wheels 61 and a second set of collector wheels 62 that define a meandering collector path P2 between them. In other words, the collector path P2 travels or extends alternatingly along a wheel of the first set of collector wheels 61 and a wheel of the second set of collector wheels 62. In FIG. 1, the collector path P2 has been schematically indicated with arrows indicating the start and end of the collector path P2. It will be clear that the collector path P2 extends between said arrows and coincides or substantially coincides with the path travelled by the drive element 5 through the overlength collector 6. More in particular, the collector path P2, like the buffer path P1, comprises a plurality of second line segments L2 extending between the collector wheels of the first set of collector wheels 61 and the second set of collector wheels 62. The second line segments L2 are bitangent to the pair of collector wheels it interconnects. More specifically, each second line segment L2 extends as an outer tangent between a pair of collector wheels of the first set of collector wheels 61 and the second set of collector wheels 62. Preferably, the second line segments L2 are substantially parallel to each other and/or to the buffer direction B.

The first set of collector wheels 61 and the second set of collector wheels 62 preferably comprise sprocket wheels that can engage with the drive element 5 in the form of a chain.

The first set of collector wheels 61 is held by or mounted to the first holder 21. The overlength collector 6 further comprises a collector frame 60 that is arranged to remain stationary in the buffer direction B while the first holder 21 moves. Preferably, the collector frame 60 is mounted to the guide 11 at or near the top end of the festooner 1. The second set of collector wheels 62 is mounted to said collector frame 60. As a result, when the first holder 21 is moved in the buffer direction B, the first set of collector wheels 61 moves apart from or towards the second set of collector wheels 62. Hence, the length increase or decrease of the drive element 5 in the overlength collector 6, i.e. in the collector path P2, is defined by the relative movement between the first set of collector wheels 61 and the second set of collector wheels 62 in the buffer direction B. Said relative movement is generated by the movement of the first holder 21 in the buffer direction B. In contrast, the length increase or decrease of the drive element 5 in the buffer path P1 is defined by the opposite movements of the first holder 21 and the second holder 22 in the buffer direction B. Hence, the change in distance between the first holder 21 and the second holder 22 during their respective opposite movements is twice the change in distance between the first holder 21 and the collector frame 60.

To collect all of the overlength resulting from the festooner 1 being at minimum capacity, the number of collector wheels of the first set of collector wheels 61 is twice the number of buffer wheels of the first set of buffer wheels 71. Alternatively formulated, the number of second line segments L2 is twice the number of first line segments L1. Consequently, when the first holder 21 is moved in the buffer direction B, the length of the drive element 5 is increased or decreased over a number of second line segments L2 that is twice the number of first line segments L1. This allows the collector path P2 to collect an overlength of the drive element 5 that is equal or substantially to the decrease of the length of the drive element 5 extending along the buffer path P1 when the festooner 1 is at minimum capacity, and conversely to pay out or off load an overlength equal or substantially equal to the increase of the length of the drive element 5 extending along the buffer path P1 when the festooner 1 moves towards maximum capacity. In other words, with only the movement of the first holder 21 in one direction of the buffer direction B, the collector path P2 can be increased or decreased with the same amount that the buffer path P1 is decreased or increased as a result of the opposite movement of both the first holder 21 and the second holder 22 in the buffer direction B.

A method for buffering a strip S using the aforementioned festooner 1 will now be briefly discussed with reference to FIGS. 1, 2A and 2B. In particular, the method comprises the steps of:

- guiding a strip S through the festooner 1 along the buffer path P1;
- driving each buffer roller of the first set of buffer rollers 41 and the second set of buffer rollers 42 with the endless drive element 5;
- varying the buffer capacity of the festooner 1 by moving the first holder 21 and the second holder 22 towards and/or away from each other in the buffer direction B; and
- collecting and/or paying out the overlength of the endless drive element 5 with the overlength collector 6 in response to varying the buffer capacity.

For the initial guiding of the strip S through the festooner 1 along the buffer path P1, the first holder 21 and the second holder 22 can be moved in the buffer direction B towards each other into a first loading position and a second loading position, respectively, as shown in FIG. 2B. The strip S can subsequently be manually guided through the festooner 1 along the buffer path P1, while the first holder 21 and the second holder 22 are conveniently located at an ergonomic working height in close proximity to, i.e. directly above and below, the intermediate member 3.

Figure 3:
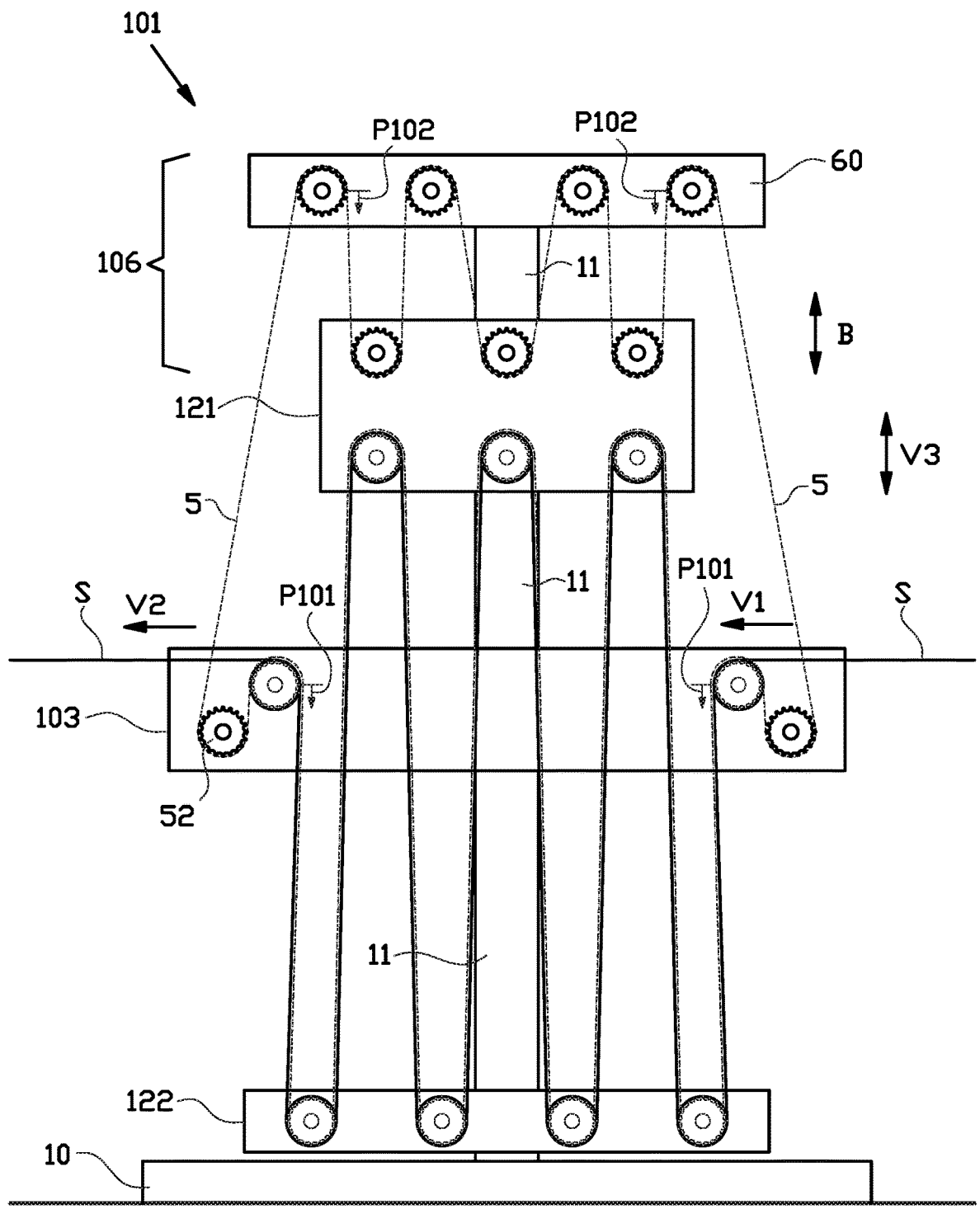
FIG. 3 shows a front view of an alternative festooner according to a second exemplary embodiment of the invention.
Figure 4:
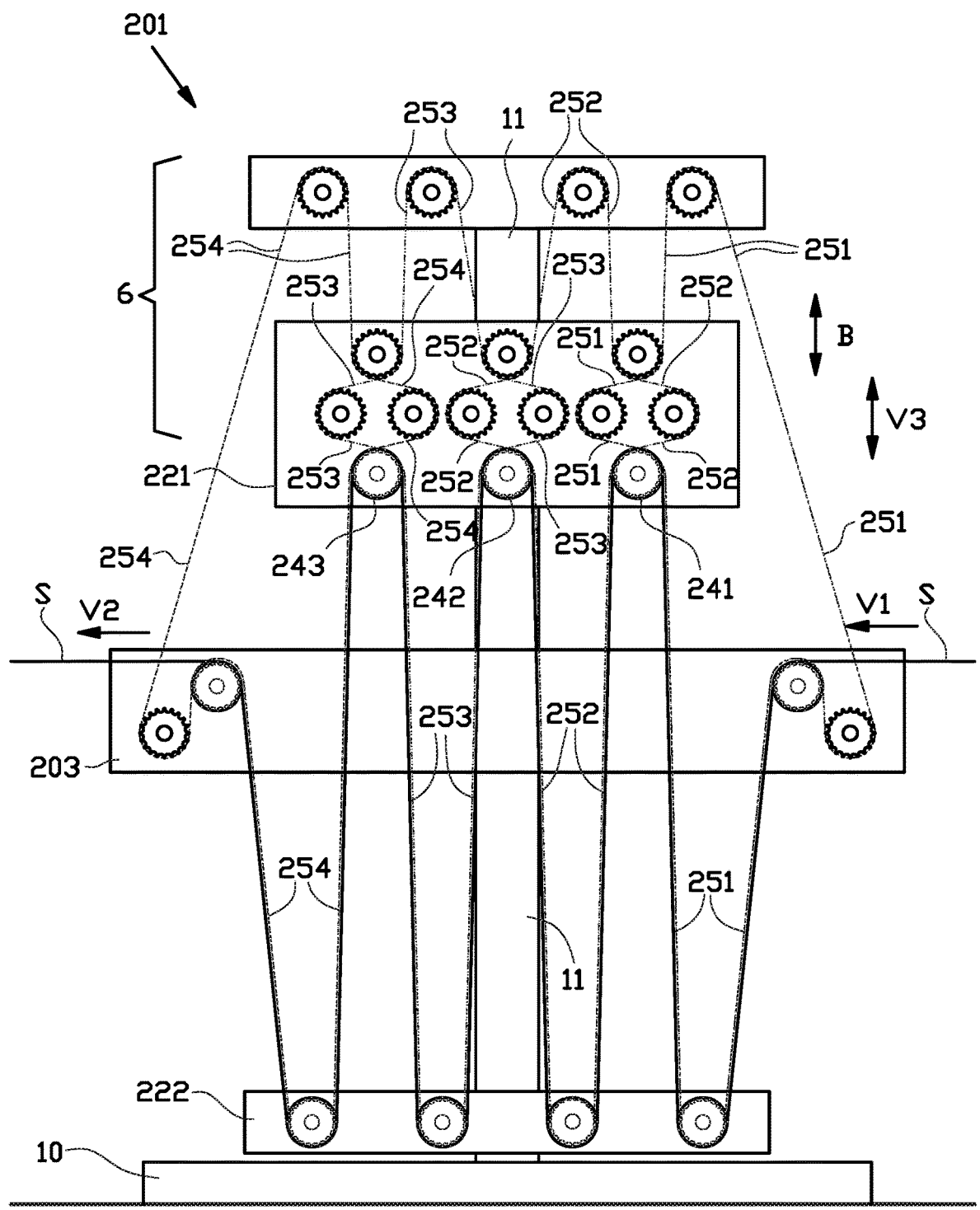
FIG. 4 shows a front view of a further alternative festooner according to a third exemplary embodiment of the invention.
Figure 5:
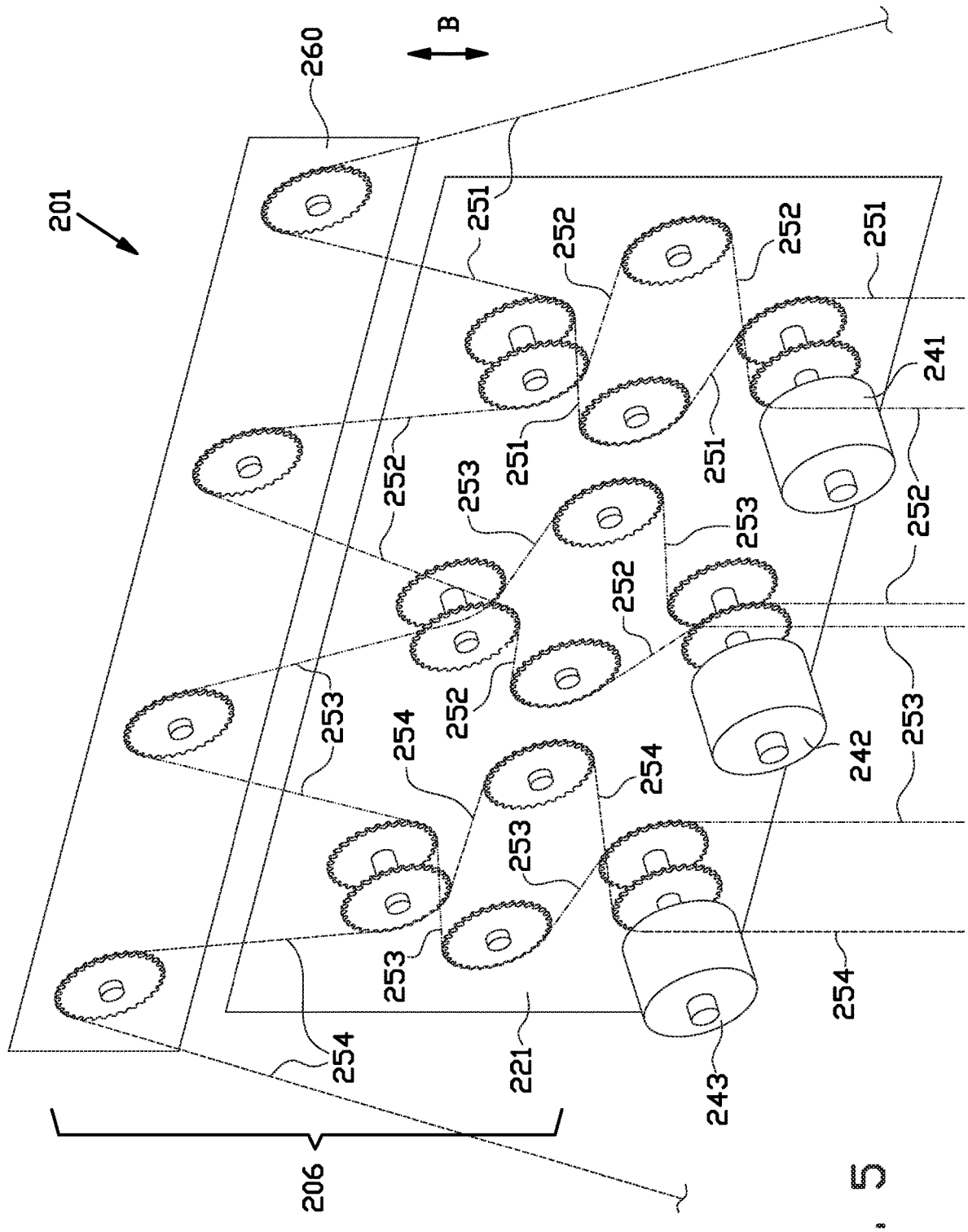
FIG. 5 shows an isometric view of a detail of the further alternative festooner according to FIG. 4.

FIG. 3 shows an alternative festooner 101 according to a second, unclaimed embodiment of the invention, which differs from the aforementioned festooner 1 in that the first holder 121 is movable relative to the intermediate member 103, while the second holder 122 is fixed. Consequently, the length increase of the buffer path P101 is generated only by the movement of the first holder 121 and can be compensated with a modified overlength collector 106 in which the collector path P102 has the same amount of line segments as the buffer path P101. This alternative festooner 101 has considerably less capacity than the previously discussed festooner 101. Moreover, in this embodiment, the operator has to reach up and down between the first holder 121 in a loading position at or near the intermediate member 103 and the second holder 122 that is fixed near the bottom end of the festooner 1.

Figure 6:
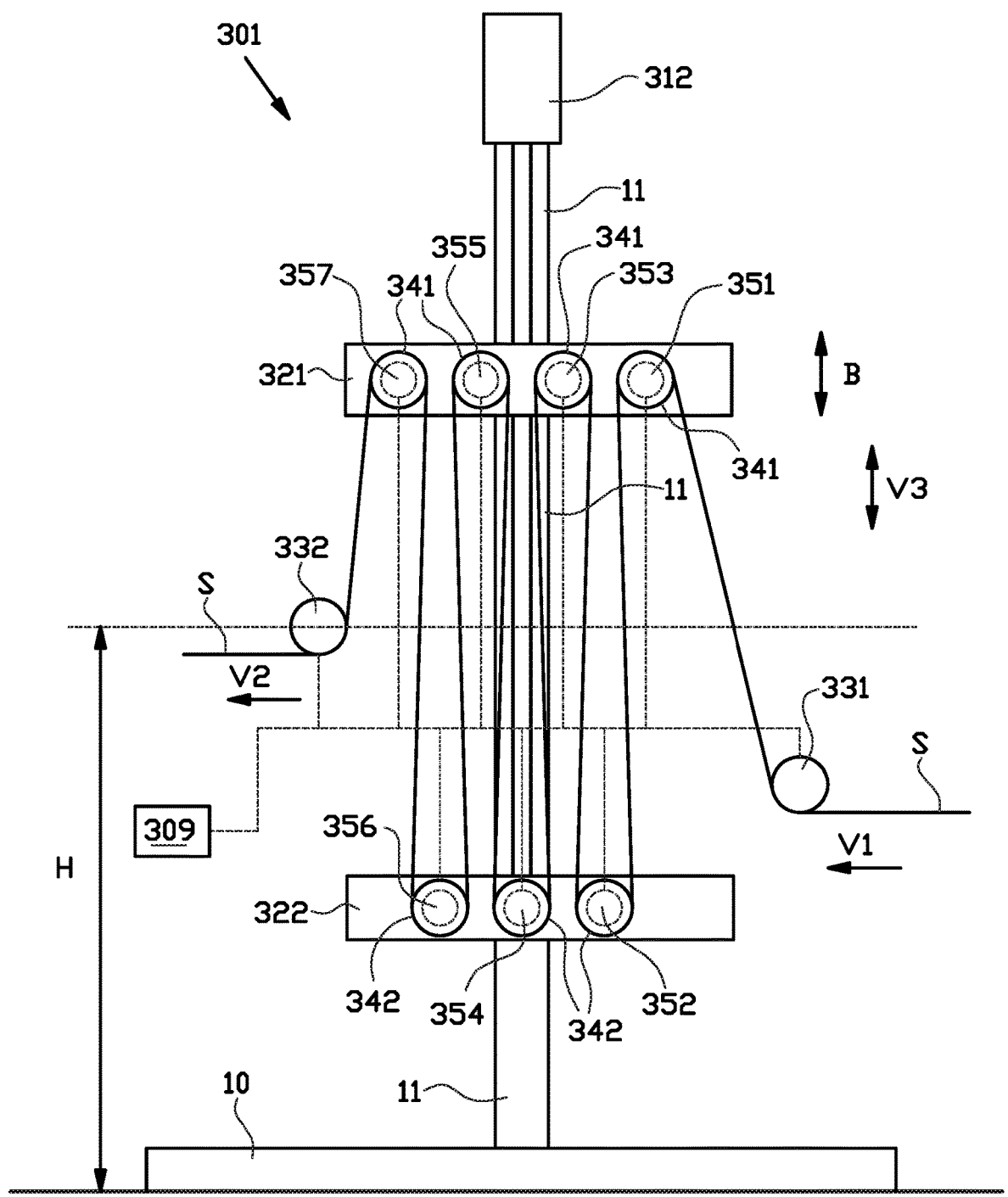
FIG. 6 shows a front view of a further alternative festooner according to a fourth exemplary embodiment of the invention.

FIG. 6 shows a further alternative festooner 301 according to a fourth embodiment of the invention, which differs from the previously discussed festooners 1, 101, 201 in that it comprises a plurality of actuators or drives 351-357, in particular electric motors, to drive the buffer rollers of the first set of buffer rollers 341 and the second set of buffer rollers 342 individually. Each drive of the plurality of drives 351-357 is held by or mounted to one of the first holder 321 and the second holder 322 to drive a respective roller of the first set of rollers 341 and the second set of rollers 342 directly. Each drive of the plurality of drives 351-357 may for example be coaxially coupled to a respective roller of the first set of rollers 341 and the second set of rollers 342.

The further alternative festooner 301 may further comprise a festooner motor 312 that is operationally coupled to the first holder 321 and the second holder 322 to generate a relative movement between the first holder 321 and the second holder 322 in the buffer direction B.

In this exemplary embodiment, both the first holder 321 and the second holder 322 are oppositely movable towards and away from each other in a buffer direction B to vary a buffer capacity of the festooner 301. In particular, the first holder 321 and the second holder 322 are movable in the buffer direction B towards each other into a first loading position and a second loading position, respectively, on opposite sides of an intermediate position at a height H above the ground surface in a range of fifty centimeters to one-hundred-and-eighty centimeters, preferably one-hundred centimeters to one-hundred-and-eighty centimeters.

As schematically shown in FIG. 6, the festooner 301 further comprises a control unit 309 that is electronically and/or operationally connected to each drive of the plurality of drives 351-357. The control unit 309 is arranged, programmed, adapted or configured to control each drive of the plurality of drives 351-357 individually. More in particular, considering that the strip S enters the further alternative festooner 301 with an entry speed V1 and exits the further alternative festooner 301 with an exit speed V2, and that the buffer capacity of the further alternative festooner 301 changes with a capacity change speed V3, the control unit 309 is configured for controlling each drive of the plurality of drives 351-357 based on the entry speed V1, the exit speed V2, the capacity change speed V3 and/or the position of the respective drive 351-357 within the festooner 301. The entry speed V1, exit speed V2 and capacity change speed V3 may be measured or detected with suitable sensors, i.e. at the entry roller 331, the exit roller 332, and/or by measuring the position of at least one of the first holder 321 and the second holder 322. Alternative, the entry speed V1 can be derived from parameters of an upstream station, i.e. the extruder E as shown in FIG. 1, and the exit speed V2 may be derived from parameters of a downstream station, i.e. the cutter C, as shown in FIG. 1, or an applicator.

FIGS. 7-12 show further alternative festooners 401, 501, 601, 701, 801, 901 according to a fifth embodiment, a sixth embodiment, a seventh embodiment, an eighth embodiment, a ninth embodiment and a tenth embodiment, respectively, of the invention. The further alternative festooners 401, 501, 601, 701, 801, 901 feature a first holder 421 and a second holder 422 which are movable in a buffer direction B along a frame, column or a guide 411 towards and away from each other in a way similar to the first holder and the second holder in the previously discussed embodiments. The further alternative festooners 401, 501, 601, 701, 801, 901 are also provided with the same buffer rollers, an endless drive element, buffer wheels, collector wheels and an overlength collector. As the embodiments in FIGS. 7-12 focus on adding a tensioning force to or exerting a tensioning force onto the holders 421, 422 in the buffer direction B, the rest of the festooners 401, 501, 601, 701, 801, 901 has been shown in a simplified manner. The features of the embodiments in FIGS. 7-12 may however be applied to each of the previously discussed embodiments.

Each alternative festooner 401, 501, 601, 701, 801, 901 as shown in FIGS. 7-12 is provided with a tensioner 408, 508, 608, 708, 808, 908 which each in its own way add or exert a tensioning force onto the holders 421, 422 in the buffer direction B. The tensioning force is intended to mitigate the effects of driving forces being exerted onto said holders 421, 422 by the endless drive element 5. Said driving forces may for example be caused by friction between the endless drive element 5 and the buffer/collector wheels and/or by kinetic energy generated within the endless drive element 5 itself. When such driving forces exceed the mass of the first holder 421 and/or the second holder 422, they may cause one or both of said holders 421, 422 to move unpredictably.

Said tensioner 408, 508, 608, 708, 808, 908 may be located at the rear side of the respective festooner 401, 501, 601, 701, 801, 901 to prevent interference with the strip.

Figure 7:
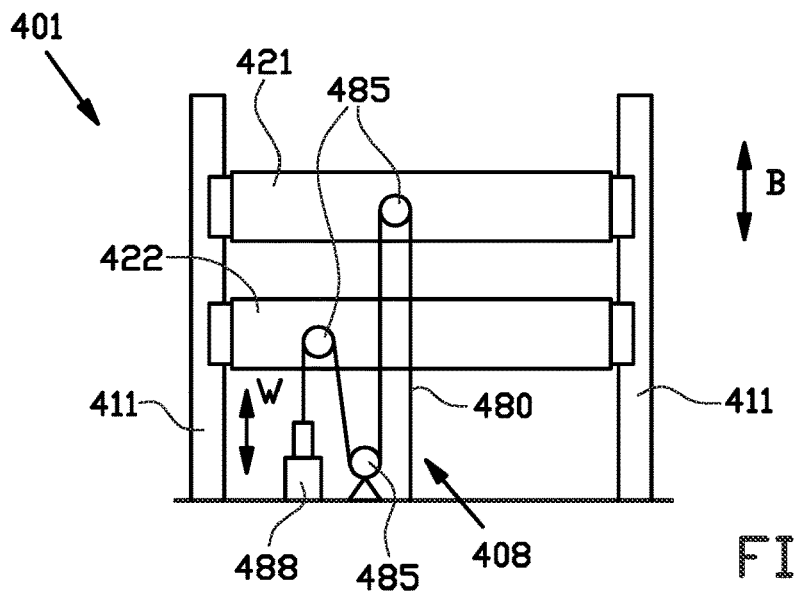
FIGS. 7-12 show rear views of further alternative festooners according to a fifth embodiment, a sixth embodiment, a seventh embodiment, an eighth embodiment, a ninth embodiment and a tenth embodiment, respectively, of the invention.

The alternative festooner 401 of FIG. 7 features a tensioner 408 with a tensioning element, in particular a tensioning strip, a tensioning chain or a tensioning band 480 that is guided by, passed along or reeved through a number of pulleys 485 along the first holder 421 and the second holder 421. The tensioning band 480 has a reeving factor of two. The pulleys 485 at the first holder 421 and the second holder 422 are connected to said first holder 421 and said second holder 422, respectively. At one end, the tensioning band 480 is fixed, i.e. to the ground or the factory floor. The other end of the tensioning band 480 is connected to a tension adjustment member 488, in particular a pneumatic cylinder, which can be controlled to retract or extend in a tension direction W, thereby increasing or decreasing the tension in the tensioning band 480 and/or compensating for a difference in length when the first holder 421 and the second holder 422 are moved over different distances. In this example, the tension direction W is parallel or substantially parallel to the buffer direction B.

Figure 8:
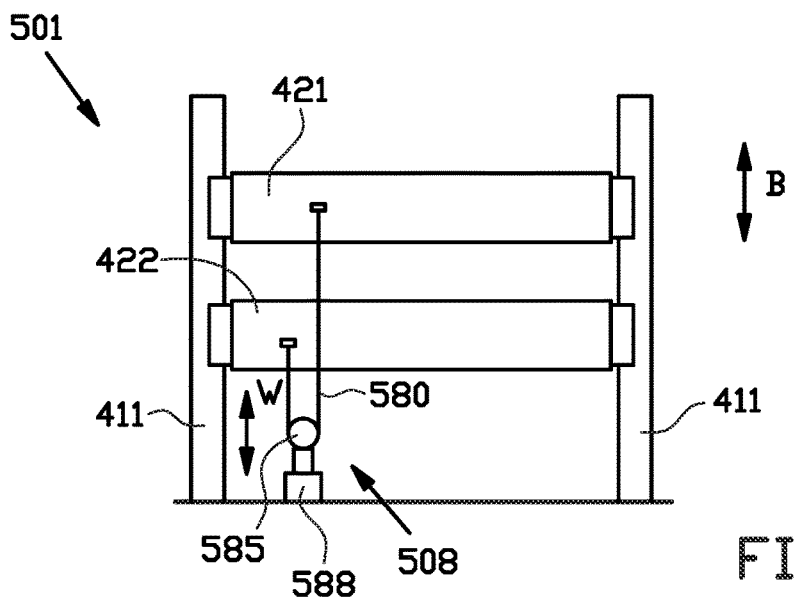

The alternative festooner 501 of FIG. 8 differs from the festooner 401 of FIG. 7 in that the tensioner 508 comprises a tensioning band 580 that is connected with one end to the first holder 421 and with the other end to the second holder 422, while it is being coupled to tension adjustment member 588 by running along a single pulley 585 that is connected to said the tension adjustment member 588. The tensioning band 580 has a reeving factor of one. The tension adjustment member 588 of this embodiment may be provided with a shorter stroke.

Figure 9:
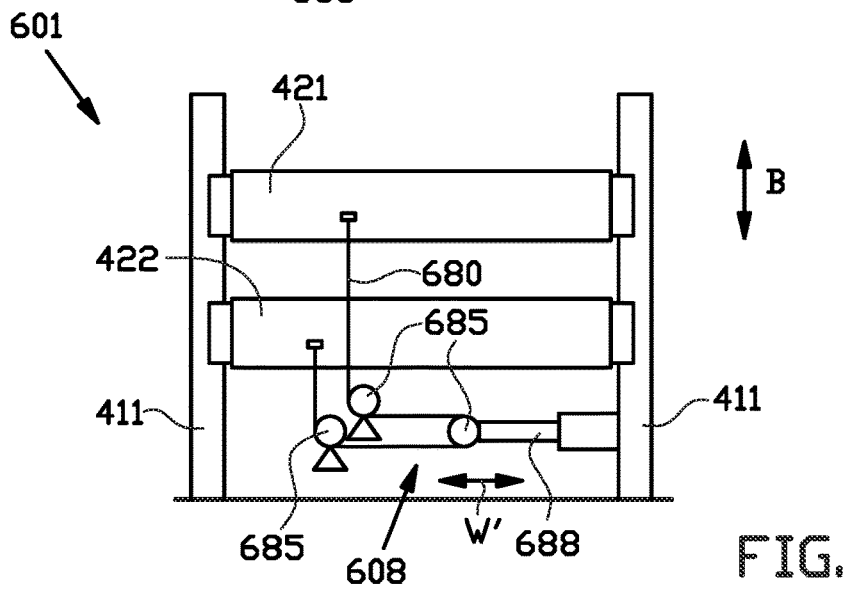
Figure 10:
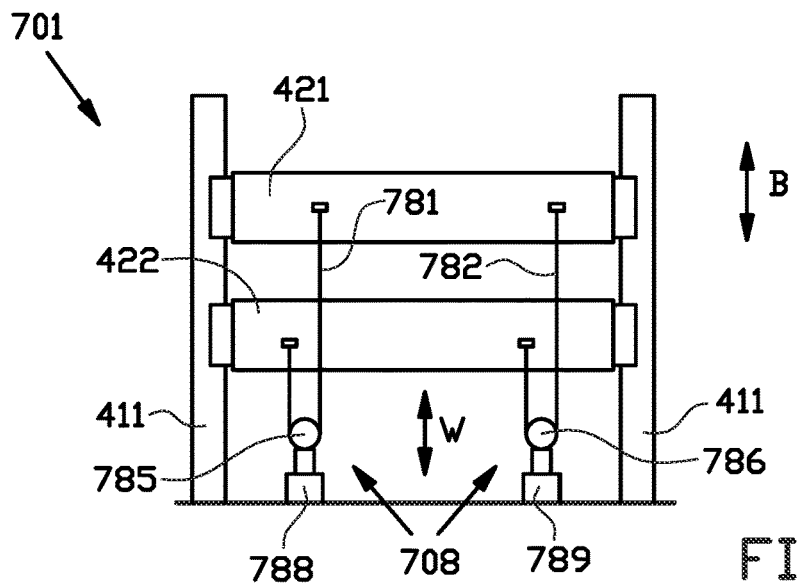
Figure 11:
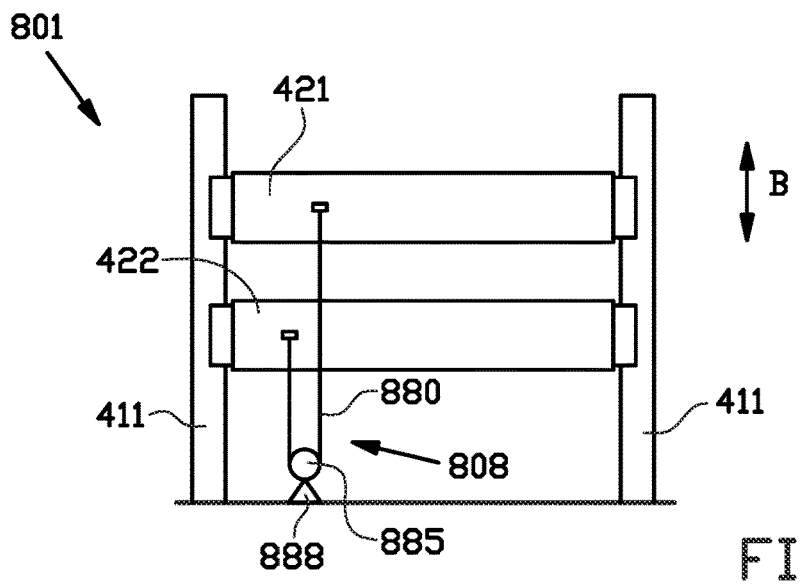
Figure 12:
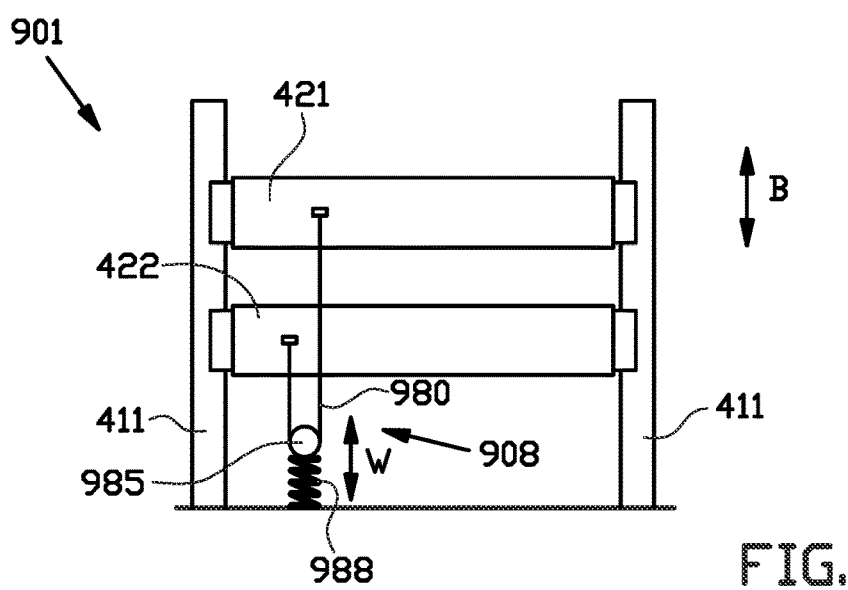

The alternative festooner 601 of FIG. 9 is similar to the festooner 501 of FIG. 8 in that the tensioner 608 comprises a tensioning band 680 that is connected with one end to the first holder 421 and with the other end to the second holder 422, while being coupled to tension adjustment member 688 by running along a single pulley 685 that is connected to said the tension adjustment member 688. However, the tension adjustment member 688 operates in an alternative tensioning direction W' that is transverse or perpendicular to the buffer direction B. Accordingly, the tensioning band 680 is deflected by a number of pulleys 685 from the buffer direction B towards and/or into the alternative tensioning direction W'. This embodiment requires less space in the buffer direction B to accommodate the tension adjustment member 688.

The alternative festooner 701 of FIG. 10 is again similar to the festooner 501 of FIG. 8, although it features a dual tensioner 708 having two sets of components, each set comprises a tensioning band 781, 782, pulleys 785, 786 and a tension adjustment member 788, 789. The tensioning bands 781, 782 may be connected to the first holder 421 and the second holder 422 in spaced apart locations to prevent skewing or tilting of the alternative festooner 701.

The alternative festooner 801 of FIG. 11 is again similar to the festooner 501 of FIG. 8, apart from the tensioner 808 having a fixed mounting member 888 instead of a tension adjustment member. The fixed mounting member 888 is arranged to hold the pulley 885 in fixed position relative to the factory floor. The tensioner 808 thus has a simplified construction, which can for example be used when the first holder 421 and the second holder 422 are moved over the same distance which each change in capacity of the festooner 501. Consequently, the tensioning band 880 can be kept at a constant length and/or tension.

The alternative festooner 901 of FIG. 12 is again similar to the festooner 501 of FIG. 8, apart from the tensioner 908 having a tension biasing member 988 instead of a tension adjustment member. The tension biasing member 988, in this example a spring, is biased to pull on the pulley 985 and thereby exert a tension force on the tensioning band 980 in the tensioning direction W.

In addition to the configurations shown in FIGS. 7-12 numerous other configurations are envisioned, e.g. with the tension adjustment at different positions such as mounted at one of the holders 421, 422, either horizontally or vertically. Also different reeving configurations are envisioned, e.g. a reeving factor of one-and-a-half with one band termination on the frame 411, and the other termination on one of the holders 421, 422; or a reeving factor of four with additional intermediate deflection pulleys.

Alternatively, weight may be added to the first holder 421 and the second holder 422 to add the aforementioned tensioning force and to overcome and/or compensate for the driving forces.

The previously discussed festooners 1, 101, 201, 301, 401, 501, 601, 701, 801, 901 all share the same benefit that speed differences between the strip S and the festooner 1, 101, 201, 301, 401, 501, 601, 701, 801, 901, and as a result thereof tensile forces in the strip S, can be reduced to a minimum. In particular, the forces exerted on the strip S can be reduced or prevented to such an extent that the strip S can be guided through the festooner 1, 101, 201, 301, 401, 501, 601, 701, 801, 901 without a liner, i.e. in direct contact with the rollers of the festooner 1, 101, 201, 301, 401, 501, 601, 701, 801, 901. This is particularly relevant for thin or hot strips, such as gum strips used in tire building, because said strips can be easily deformed. Without a liner, the buffering process is less costly and more durable, because there is less waste.

Figure 13A:
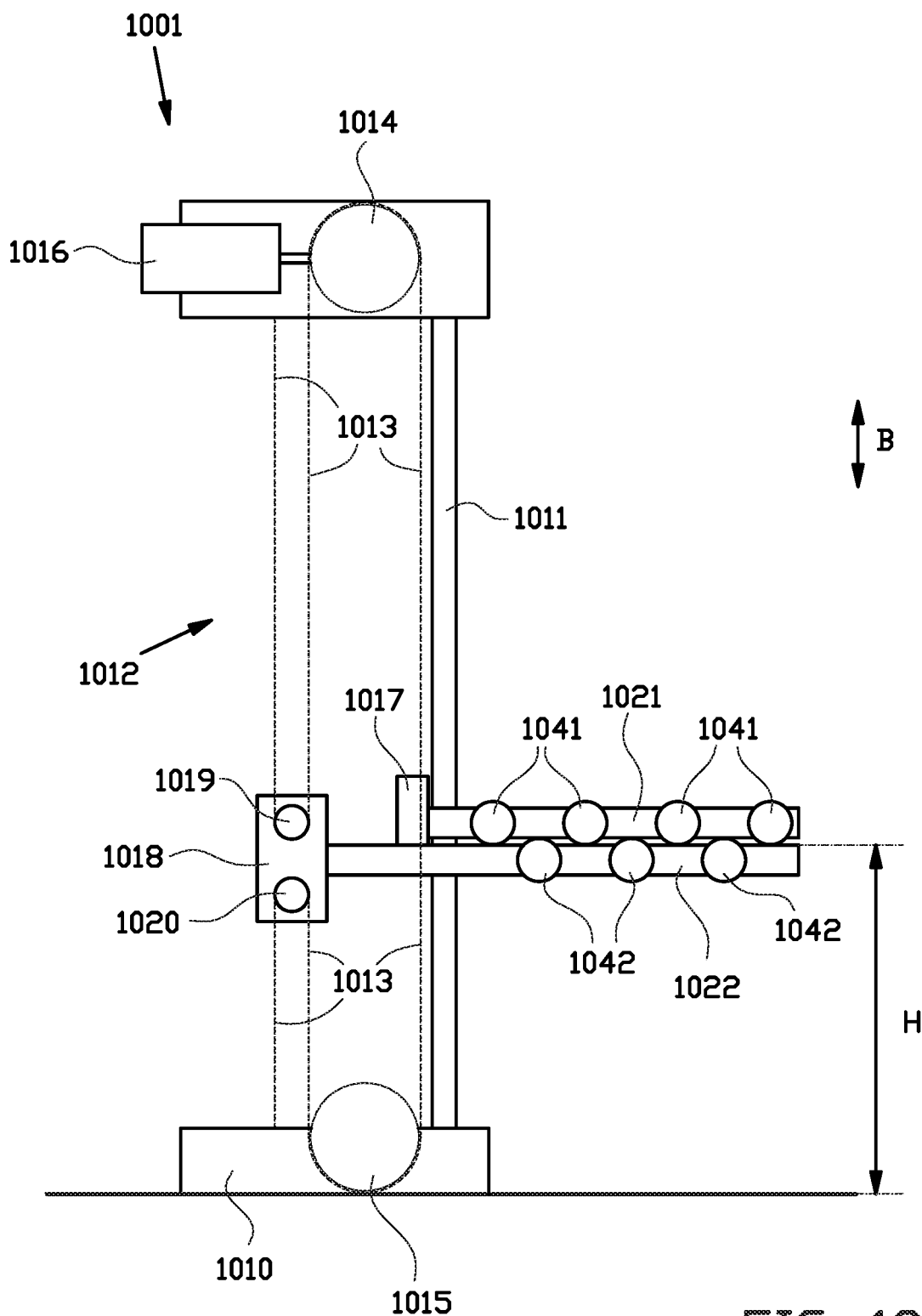
FIGS. 13A and 13B show front views of further alternative festooner according to an eleventh embodiment of the invention at maximum capacity and minimum capacity, respectively.
Figure 13B:
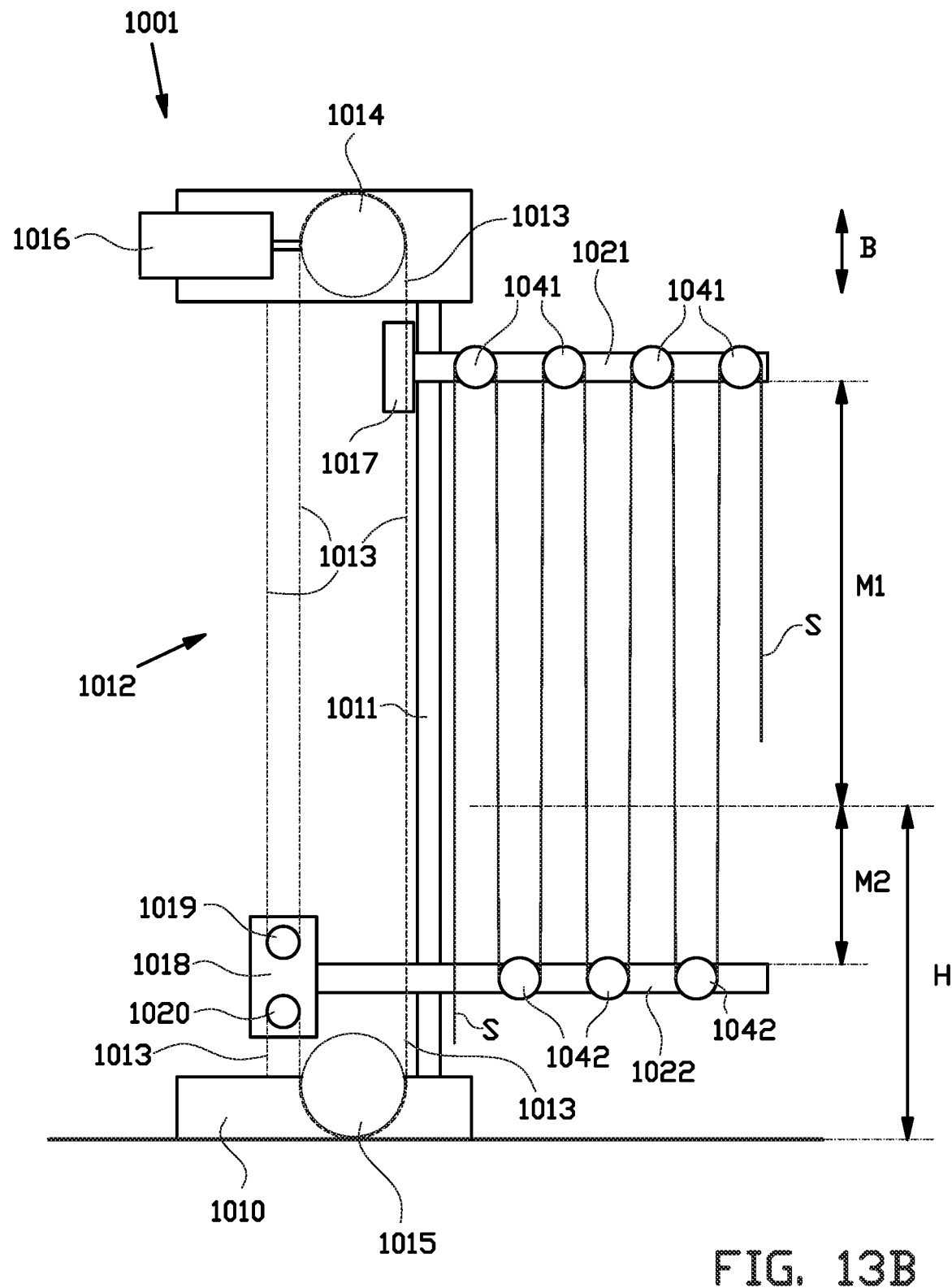

FIGS. 13A and 13B show a further alternative festooner 1001 according to an eleventh embodiment of the invention, which is similar to the festooner 1 according to the first aspect of the invention in that its holders 1021, 1022 can be moved at different travel rates, speeds and/or over different distances in the buffer direction B. In other words, one of the holders 1021, 1022 can be moved faster than the other of the holders 1021, 1022. In particular, the holders 1021, 1022 can be moved at uneven ratio.

As shown in FIG. 13B, the further alternative festooner 1001 comprises a base 1010 and a guide 1011 standing up from the base 1011 for guiding the respective movements M1, M2 of the holders 1021, 1022 in the buffer direction B. Each holder 1021, 1022 is configured for holding a group of buffer rollers 1041, 1042 in a manner similar to the previously discussed festooners 1, 101, 201, 301, 401, 501, 601, 701, 801, 901 to define a meandering buffer path P1 for the strip S. The further alternative festooner 1001 further comprises a holder drive 1012 that is operationally or functionally coupled to the first holder 1021 and the second holder 1022 for driving their opposite movements M1, M2. In this example, the holder drive 1012 comprises a belt 1013 and a plurality of pulleys 1014, 1015, 1019, 1020 that form a belt and pulley system. The first holder 1021 is coupled to a part of the belt 1013 via a first coupler 1017. The second holder 1022 is coupled to two or more parts of the belt 1013 via a second coupler 1018.

In this example, the plurality of pulleys 1014, 1015, 1019, 1020 comprises an upper pulley 1014 that is arranged at the upper end of the guide 1011, a lower pulley 1015 that is arranged at the lower end of the guide 1011, at or near the base 1010, and mobile or movable pulleys 1019, 1020 along which the belt 1013 is reeved and which are movable in the buffer direction B. The movable pulleys 1019, 1020 are both carried by or connected to the second coupler 1018. One of the pulleys 1014, 1015, 1019, 1020, in this particular example the upper pulley 1014, is driven by a motor 1016 to rotate and drive the belt 1013. The belt 1013 may be a timing belt or a chain.

The belt and pulley system as shown has a reeving factor of two, meaning that second holder 1022 is coupled to and/or driven by two parts of the belt 1013. The second holder 1022 is therefore moved twice as slow compared to the first holder 1021 that is coupled to and/or driven by a single part of the belt 1013. In other words, the first holder 1021 can be moved twice as fast. Hence, an uneven ratio between the movements M1, M2 of the first holder 1021 and the second holder 1022 can be obtained of 2:1.

Consequently, as shown in FIG. 13A, the first holder 1021 and the second holder 1022 are movable in the buffer direction B towards each other into a first loading position and a second loading position, respectively, on opposite sides of an intermediate position at an ergonomic height H above the ground surface, in particular a height H in a range of fifty centimeters to one-hundred-and-eighty centimeters.

Figure 14:
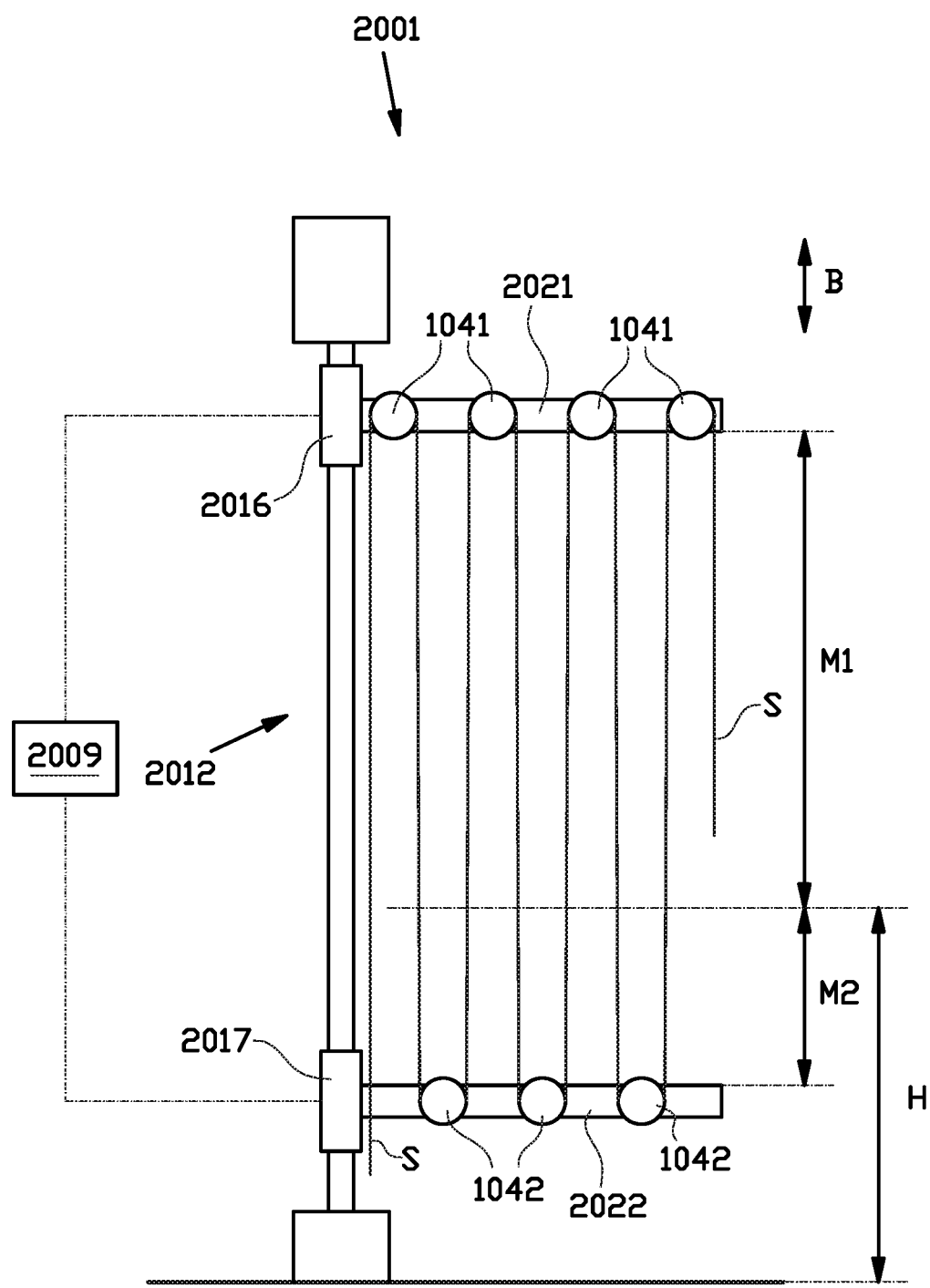
FIG. 14 shows a front view of further alternative festooner according to a twelfth embodiment of the invention at maximum capacity.

FIG. 14 shows a further alternative festooner 2001 according to a twelfth embodiment of the invention which differs from the further alternative festooner 1001 according to the eleventh aspect of the invention in that the holder drive 2012 comprises a first motor 2016 and a second motor 2017 for moving the first holder 2021 and the second holder 2022, respectively, in the buffer direction B. The further alternative festooner 2001 further comprises a control unit 2009 that is electronically, functionally and/or operationally connected to the first motor 2016 and the second motor 2017 to control the movements M1, M2 in the aforementioned uneven ratio. The motors 2016, 2017 may be linear motors, servo motors or any other type of motor capable of moving the holders 2021, 2022 in the buffer direction B.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

LIST OF REFERENCE NUMERALS 1 festooner
10 base
11 guide
21 first holder
22 second holder
3 intermediate member
31 entry roller
32 exit roller
41 first set of buffer rollers
42 second set of buffer rollers
5 endless drive element
51 first drive
52 second drive
6 overlength collector
60 collector frame
61 first set of collector wheels
62 second set of collector wheels
71 first set of buffer wheels
72 second set of buffer wheels
73 third set of buffer wheels
101 alternative festooner
201 further alternative festooner
221 first holder
222 second holder
203 intermediate member
251 first drive element
252 second drive element
253 third drive element
254 fourth drive element
255 fifth drive element
301 further alternative festooner
312 festooner motor
321 first holder
322 second holder
331 entry roller
332 exit roller
341 first set of buffer rollers
342 second set of buffer rollers
351-357 drive
309 control unit
401 further alternative festooner
408 tensioner
480 tensioning band
485 pulley
488 tension adjustment member
501 further alternative festooner
508 tensioner
580 tensioning band
585 pulley
588 tension adjustment member
601 further alternative festooner
608 tensioner
680 tensioning band
685 pulley
688 tension adjustment member
701 further alternative festooner
708 tensioner
781 first tensioning band
782 second tensioning band
785 first pulley
786 second pulley
788 first tension adjustment member 789 second tension adjustment member
801 further alternative festooner
808 tensioner
880 tensioning band
885 pulley
888 mounting member
901 further alternative festooner
908 tensioner
980 tensioning band
985 pulley
988 tension biasing member
1001 further alternative festooner
1010 base
1011 guide
1012 holder drive
1013 drive belt
1014 upper pulley
1015 lower pulley
1016 motor
1017 first coupler
1018 second coupler
1019 first movable pulley
1020 second movable pulley
1021 first holder
1022 second holder
1041 first set of buffer rollers
1042 second set of buffer rollers
2001 further alternative festooner
2016 first motor
2017 second motor
2021 first holder
2022 second holder
2009 control unit
B buffer direction
C cutter
E extruder
H height
L1 first line segment
L2 second line segment
M1 first holder movement
M2 second holder movement
P1 buffer path
P2 collector path
P101 buffer path
P102 collector path
S strip
V1 entry speed
V2 exit speed
V3 capacity change speed
W tension adjustment direction
W' alternative tension adjustment direction

The invention claimed is:

1. A festooner for buffering a strip, wherein the festooner comprises a first holder and a second holder which are oppositely movable towards and away from each other in a buffer direction to vary a buffer capacity of the festooner, and a first set of buffer rollers and a second set of buffer rollers held by the first holder and the second holder, respectively, wherein the first set of buffer rollers and the second set of buffer rollers define a meandering buffer path between them extending alternatingly along a buffer roller of the first set of buffer rollers and a buffer roller of the second set of buffer rollers, wherein the festooner further comprises an endless drive element for driving each buffer roller of the first set of buffer rollers and the second set of buffer rollers, wherein the festooner further comprises an overlength collector for collecting and paying out an overlength of the endless drive element as a result of a variation in the buffer capacity of the festooner, wherein the overlength collector comprises a first set of collector wheels and a second set of collector wheels that define a meandering collector path between them extending alternatingly along a collector wheel of the first set of collector wheels and a collector wheel of the second set of collector wheels, wherein the endless drive element extends along the collector path, wherein the meandering buffer path comprises a plurality of first line segments extending between the buffer rollers of the first set of buffer rollers and the second set of buffer rollers, wherein the meandering collector path comprises a plurality of second line segments extending between the collector wheels of the first set of collector wheels and the second set of collector wheels, and wherein the number of second line segments is at least twice the number of first line segments.

2. The festooner according to claim 1, wherein the overlength collector is located in the buffer direction at one side of the buffer path only.

3. The festooner according to claim 1, wherein the overlength collector is located in the buffer direction at a side of the first set of buffer rollers facing away from the second set of buffer rollers.

4. The festooner according to claim 1, wherein the first set of buffer rollers is located above the second set of buffer rollers, wherein the overlength collector is located above the first set of buffer rollers.

5. The festooner according to claim 1, wherein the overlength collector has a collector capacity that is sufficient to collect the entire overlength of the endless drive element when the buffer capacity of the festooner is at a minimum.

6. The festooner according to claim 1, wherein the overlength collector comprises a collector frame that is arranged to remain stationary in the buffer direction while the first holder and the second holder move, wherein the first set of collector wheels is held by the first holder and wherein the second set of collector wheels is held by the collector frame.

7. The festooner according to claim 1, wherein the festooner comprises a first set of buffer wheels and a second set of buffer wheels that are coaxially mounted to and rotatable together with the first set of buffer rollers and the second set of buffer rollers, respectively, wherein the endless drive element is arranged for driving each buffer roller of the first set of buffer rollers and the second set of buffer rollers individually by engaging the respective buffer wheels of the first set of buffer wheels and the second set of buffer wheels, respectively.

8. The festooner according to claim 1, wherein the festooner further comprises an intermediate member for guiding the strip into and out of the festooner, wherein the intermediate member is arranged to remain stationary in the buffer direction between the first holder and the second holder while the first holder and the second holder move.

9. The festooner according to claim 8, wherein the first holder and the second holder are movable in the buffer direction towards each other into a first loading position and a second loading position, respectively, directly adjacent to and on opposite sides of the intermediate member.

10. The festooner according to claim 8, wherein the festooner comprises a base for placement of said festooner on a ground surface, wherein the intermediate member is positioned relative to the base such that the intermediate member extends at a height above the ground surface in a range of fifty centimeters to one-hundred-and-eighty centimeters.

11. The festooner according to claim 1, further comprising a tensioner for exerting a tensioning force onto the first holder and the second holder in the buffer direction.

12. The festooner according to claim 11, further comprising a tensioning band that is connected to the first holder and the second holder, wherein at least one end of the tensioning band is coupled to a tension adjustment member.

13. The festooner according to claim 11, further comprises a tensioning band that is connected to the first holder and the second holder, wherein at least one end of the tensioning band is coupled to a tension biasing member.

14. A method for buffering a strip using a festooner according to claim 1, wherein the method comprises the steps of:
   guiding a strip through the festooner along the buffer path;
   driving each buffer roller of the first set of buffer rollers and the second set of buffer rollers with the endless drive element;
   varying the buffer capacity of the festooner by moving the first holder and the second holder towards or away from each other in the buffer direction; and
   collecting or paying out the overlength of the endless drive element with the overlength collector in response to varying the buffer capacity.

15. The method according to claim 14, wherein the festooner further comprises an intermediate member for guiding the strip into and out of the festooner and a base for placement of said festooner on a ground surface, wherein the method further comprises the steps of:
   maintaining the intermediate member in the buffer direction between the first holder and the second holder in a stationary position at a height above the ground surface in a range of fifty centimeters to one-hundred-and-eighty centimeters;
   moving the first holder and the second holder in the buffer direction towards each other into a first loading position and a second loading position, respectively, directly adjacent to and on opposite sides of the intermediate member; and
   manually guiding the strip through the festooner along the buffer path while the first holder and the second holder are in the first loading position and the second loading position, respectively.

\* \* \* \* \*